United States Patent
Faisal et al.

(10) Patent No.: US 11,819,833 B2
(45) Date of Patent: Nov. 21, 2023

(54) CONDUCTING POLYMER AND CARBON NITRIDE BASED NANOCOMPOSITE PHOTOCATALYST FOR DEGRADATION OF AQUEOUS ORGANIC POLLUTANTS

(71) Applicant: NAJRAN UNIVERSITY, Najran (SA)

(72) Inventors: M. Faisal, Najran (SA); Md. A. Rashed, Najran (SA); Jahir Ahmed, Najran (SA); Mabkhoot Alsaiari, Najran (SA); Mohammed Jalalah, Najran (SA); S A. Alsareii, Najran (SA); Farid A. Harraz, Najran (SA)

(73) Assignee: NAJRAN UNIVERSITY, Najran (SA)

(*) Notice: Subject to any disclaimer, the term of this patent is extended or adjusted under 35 U.S.C. 154(b) by 0 days.

(21) Appl. No.: 17/700,585

(22) Filed: Mar. 22, 2022

(65) Prior Publication Data
US 2023/0330644 A1    Oct. 19, 2023

(51) Int. Cl.
*B01J 27/24* (2006.01)
*B01J 35/00* (2006.01)
*B01J 21/18* (2006.01)
*B01J 23/52* (2006.01)
*B01J 35/02* (2006.01)
*B01J 35/10* (2006.01)
*B01J 37/08* (2006.01)
*B01J 37/34* (2006.01)
*B01J 31/06* (2006.01)
*C02F 1/30* (2023.01)
(Continued)

(52) U.S. Cl.
CPC ............ *B01J 27/24* (2013.01); *B01J 21/18* (2013.01); *B01J 23/52* (2013.01); *B01J 31/06* (2013.01); *B01J 35/004* (2013.01); *B01J 35/006* (2013.01); *B01J 35/0013* (2013.01); *B01J 35/023* (2013.01); *B01J 35/1061* (2013.01); *B01J 37/04* (2013.01); *B01J 37/08* (2013.01); *B01J 37/343* (2013.01); *C02F 1/30* (2013.01); *C02F 2101/30* (2013.01)

(58) Field of Classification Search
None
See application file for complete search history.

(56) References Cited

FOREIGN PATENT DOCUMENTS

| CN | 102329424 A | * | 1/2012 |
| CN | 103406152 A | | 11/2013 |
| CN | 111889137 A | | 11/2020 |

(Continued)

OTHER PUBLICATIONS

CN-113406171-A, English translation (Year: 2011).*

(Continued)

*Primary Examiner* — Stefanie J Cohen
(74) *Attorney, Agent, or Firm* — Oblon, McClelland, Maier & Neustadt, L.L.P.

(57) ABSTRACT

A nanocomposite photocatalyst is provided. The nanocomposite photocatalyst contains carbon nitride particles, a polymer composite comprising a conducting polymer and a carbon nanomaterial, the polymer composite being disposed on the carbon nitride particles, and noble metal nanoparticles disposed on both the polymer composite and the carbon nitride particles. Also provided is a method of forming the nanocomposite photocatalyst and a method of photodegrading an organic pollutant in water using the nanocomposite photocatalyst and visible light irradiation.

9 Claims, 10 Drawing Sheets

(51) Int. Cl.
   B01J 37/04   (2006.01)
   C02F 101/30   (2006.01)

(56) References Cited

FOREIGN PATENT DOCUMENTS

| CN | 112718000 A | 4/2021 |
| CN | 113198463 A | 8/2021 |
| CN | 113406171 A | * 9/2021 |

OTHER PUBLICATIONS

Xu et al., conductive carbon nitride for excellent energy storage, Adv. Mater., 29, pp. 1-8 (Year: 2017).*
CN-113406171-A, English translation (Year: 2021).*
Wang et al., 2D graphitic carbon nitride for energy conversion and storage, advanced functional materials, vol. 31, 34, 1-38 (Year: 2021).*
Xixian Huang, et al., "Novel Au@C modified g-$C_3N_4$ (Au@C/g-$C_3N_4$) as efficient visible-light photocatalyst for toxic organic pollutant degradation: Synthesis, performance and mechanism insight", Separation and Purification Technology, vol. 252, Dec. 1, 2020, 3 pages (Abstract only).
Yang Liu, et al., "A simple method to prepare g-$C_3N_4$/Ag-polypyrrole composites with enhanced visible-light photocatalytic activity", Catalysis Communications, vol. 87, Dec. 5, 2016, pp. 41-44.
Ningyan Cheng, et al., "Au-Nanoparticle-Loaded Graphitic Carbon Nitride Nanosheets: Green Photocatalytic Synthesis and Application toward the Degradation of Organic Pollutants", ACS Applied Materials & Interfaces, vol. 5, No. 15, Jul. 12, 2013, pp. 6815-6819.
Somayeh Azimi, et al., "Enhanced activity of clinoptilolite-supported hybridized PbS—CdS semiconductors for the photocatalytic degradation of a mixture oftetracycline and cephalexin aqueous solution", Journal of Molecular Catalysis A: Chemical, vol. 408, 2015, pp. 152-160.
Jingsheng Cao, et al., "Facile synthesis of carbon self-doped g-$C_3N_4$ for enhanced photocatalytic hydrogen evolution", Ceramics International, vol. 46, 2020, pp. 7888-7895.
Marie-Christine Daniel, et al., Gold Nanopaiticles: Assembly, Supramoleoular Chemistry, Quantum-Size-Related Properties, and Applications toward Biology, Catalysis, and Nanotechnology, Chemical Reviews, vol. 104, No. 1, 2004, pp. 293-346.
Elif Daş, et al., "Effect of carbon ratio in the polypyrrole/carbon composite catalyst support on PEM fuel cell performance" International Journal of Hydrogen Energy, vol. 41, Jun. 2016, pp. 13171-13179.
Meng Ding, et al., "Synthesis of Z-scheme g-$C_3N_4$ nanosheets/$Ag_3PO_4$ photocatalysts with enhanced visible-light photocatalytic performance for the degradation of tetracycline and dye", Chinese Chemical Letters, vol. 31, No. 1, 2019, pp. 71-76.
Fan Dong, et al., "Efficient synthesis of polymeric g-$C_3N_4$ layered materials as novel efficient visible light driven photocatalysts", Journal of Materials Chemistry, vol. 21, Aug. 22, 2011, pp. 15171-15174.
Maria Vittoria Dozzi, et al., "Effects of gold nanoparticles deposition on the photocatalytic activity of titanium dioxide under visible light", Physical Chemistry Chemical Physics, vol. 11, Jun. 15, 2009, pp. 7171-7180.
M. Faisal, et al., "Synthesis, characterizations, photocatalytic and sensing studies of ZnO nanocapsules", Applied Surface Science, vol. 258, 2011, pp. 672-677.
M. Faisal, et al., "Au nanoparticles-doped g-$C_3N_4$ nanocomposites for enhanced photocatalytic performance under visible light illumination", Ceramics International, vol. 46, 2020, pp. 22090-22101.
M. Faisal, et al., "Polythiophene/mesoporous $SrTiO_3$ nanocomposites with enhanced photocatalytic activity under visible light", Separation and Purification Technology, vol. 190, 2018, pp. 33-44.
M. Faisal, et al., "Fabrication of highly efficient $TiO_2$/$C_3N_4$ visible light driven photocatalysts with enhanced photocatalytic activity", Journal of Molecular Structure, vol. 1173, 2018, pp. 428-438.
Jun Fang, et al., "Mesoporous plasmonic Au—$TiO_2$ nanocomposites for efficient visible-light-driven photocatalytic water reduction", International Journal of Hydrogen Energy, vol. 37, 2012, pp. 17853-17861.
M. Abul Farah, et al., "Studies on lethal concentrations and toxicity stress of some xenobiotics on aquatic organisms", Chemosphere, vol. 55, 2004, pp. 257-265.
Asif Hayat, et al., "Visible-light enhanced photocatalytic performance of polypyrrole/g-$C_3N_4$ composites for water splitting to evolve $H_2$ and pollutants degradation", Journal of Photochemistry & Photobiology A: Chemistry, vol. 379, 2019, pp. 88-98.
Ahmed Helal, et al., "Hydrothermal synthesis of novel heterostructured $Fe_2O_3$/$Bi_2S_3$ nanorods with enhanced photocatalytic activity under visible light", Applied Catalysis B: Environmental, vol. 213, 2017, pp. 18-27.
Fereshteh Iazdani, et al., "Supported cuprous oxide-clinoptilolite nanoparticles: Brief identification and the catalytic kinetics in the photodegradation of dichloroaniline", Spectrochimica Acta Part A: Molecular and Biomolecular Spectroscopy, vol. 250, 2021, pp. 1-10.
Adel A. Ismail, et al., "Ease synthesis of mesoporous $WO_3$—$TiO_2$ nanocomposites with enhanced photocatalytic performance for photodegradation of herbicide imazapyr under visible light and UV illumination", Journal of Hazardous Materials, vol. 307, 2016, pp. 43-54.
Mohammed Jalalah, et al., "Comparative study on photocatalytic performances of crystalline α- and β-$Bi_2O_3$ nanoparticles under visible-light", Journal of Industrial and Engineering Chemistry, vol. 30, 2015, pp. 183-189.
Sundaramurthy Jayaraman, et al., "Enhanced luminescence and charge separation in polythiophene-grafted, gold nanoparticle-decorated, 1-D ZnO nanorods", RSC Advances. vol. 4, Feb. 14, 2014, pp. 11288-11294.
Chan Woo Lee, et al., "Simple synthesis and characterization of $SrSnO_3$ nanoparticles with enhanced photocatalytic activity", International Journal of Hydrogen Energy, vol. 37, 2012, pp. 10557-10563.
Hao Li, et al., "Facile Fabrication of a Novel Au/Phosphorus-Doped g-$C_3N_4$ Photocatalyst with Excellent Visible Light Photocatalytic Activity", Catalysts, vol. 10, Issue 701, Jun. 22, 2020, 11 pages.
Yan Li, et al., "Gold nanoparticles inlaid $TiO_2$ photoanodes: a superior candidate for high-efficiency dye-sensitized solar cells", Energy & Environmental Science, RSC Publishing, vol. 6, Apr. 26, 2013, pp. 2156-2165.
Guangqing Liu, et al., "Facile synthesis of C-doped hollow spherical g-$C_3N_4$ from supramolecular self-assembly for enhanced photoredox water splitting", International Journal of Hydrogen Energy, vol. 44, 2019, 9 pages.
Qing Ying Liu, et al., "Synthesis and enhanced photocatalytic activity of g-$C_3N_4$ hybridized CdS nanoparticles", Bulletin of Materials Science, vol. 40, No. 7, Dec. 2017, pp. 1329-1333.
Shiben Liu, et al., "Protonated graphitic carbon nitride/polypyrrole/reduced graphene oxide composites as efficient visible light driven photocatalysts for dye degradation and E. coli disinfection", Journal of Alloys and Compounds, vol. 873, 2021, 14 pages.
Rishi Maiti, et al., "Tunable optical properties of graphene oxide by tailoring the oxygen functionalities using infrared irradiation", Nanotechnology. IOP Publishing. vol. 25, Dec. 2014, 9 pages.
Satyabadi Martha, et al., "Facile synthesis of highly active g-$C_3N_4$ for efficient hydrogen production under visible light", Journal of Materials Chemistry A, vol. 1, Jun. 3, 2013, pp. 7816-7824.
Xuli Miao, et al., "Nitrogen-doped carbon dots decorated on g-$C_3N_4$/$Ag_3PO_4$ photocatalyst with improved visible light photocatalytic activity and mechanism insight", Applied Catalysis B: Environmental, vol. 227, 2018, pp. 459-469.
Anuradha Nandi, et al., "Scavenging of superoxide radical by ascorbic acid", J. Biosci., vol. 11, Nos. 1-4, Mar. 1987, pp. 435-441.
Alireza Nezamzadeh-Ejhieh, et al., "Photodecolorization of Eriochrome Black T using NiS-13 P zeolite as a heterogeneous catalyst", Journal of Hazardous Materials, vol. 176, 2010, pp. 629-637.

(56) References Cited

OTHER PUBLICATIONS

Alireza Nezamzadeh-Ejhieh, et al., "Enhancement of the photocatalytic activity of Ferrous Oxide by doping onto the nano-clinoptilolite particles towards photodegradation of tetracycline", Chemosphere, vol. 107, 2014, pp. 136-144.

Zahra Khodami, et al., "Investigation of photocatalytic effect of ZnO—$SnO_2$/nano clinoptilolite system in the photodegradation of aqueous mixture of 4-methylbenzoic acid/2-chloro-5-nitrobenzoic acid", Journal of Molecular Catalysis A: Chemical, vol. 409, 2015, pp. 59-68.

Abbas Norouzi, et al., "Preparation, characterization, and investigation of the catalytic property of $\alpha$-$Fe_2O_3$—ZnO nanopartides in the photodegradation and mineralization of methylene blue", Chemical Physics Letters, vol. 752, 2020, 10 pages.

Narges Omrani, et al., "A ternary $Cu_2O$/$BiVO_4$/$WO_3$ nanocomposite: Scavenging agents and the mechanism pathways in the photodegradation of sulfasalazine", Journal of Molecular Liquids, vol. 315, 2020, 12 pages.

Hyunwoong Park, et al., "Photocatalytic Reactivities of Nafion-Coated $TiO_2$ for the Degradation of Charged Organic Compounds under UV or Visible Light", J. Phys. Chem. B, vol. 109. No. 23, 2005, pp. 11667-11674.

Yin Peng, et al., "Synthesis of one-dimensional $Bi_2O_3$—$Bi_2O_{2.33}$ heterojunctions with high interface quality for enhanced visible light photocatalysis in degradation of high-concentration phenol and MO dyes", Applied Catalysis B: Environmental, vol. 203, 2017, pp. 946-954.

Nafiseh Pourshirband, et al., "The coupled AgI/BiOI catalyst: Synthesis, brief characterization, and study of the kinetic of the EBT photodegradation", Chemical Physics Letters, vol. 761, 2020, 10 pages.

Neda Raeisi-Kheirabadi, et al., "A Z-scheme g-$C_3N_4$/$Ag_3PO_4$ nanocomposite: Its photocatalytic activity and capability for water splitting", International Journal of Hydrogen Energy, vol. 45, 2020, 15 pages.

Subhajyoti Samanta, et al., "Facile Synthesis of Au/g-$C_3N_4$ Nanocomposites: An Inorganic/Organic Hybrid Plasmonic Photocatalyst with Enhanced Hydrogen Gas Evolution Under Visible-Light Irradiation", Chemcatchem, vol. 6, 2014, pp. 1453-1462.

Abrin L. Schmucker, et al., "Correlating Nanorod Structure with Experimentally Measured and Theoretically Predicted Surface Plasmon Resonance", ACS NANO, vol. 4, No. 9, 2010, pp. 5453-5463.

B. Sivaranjini, et al., "Vertical Alignment of Liquid Crystals Over a Functionalized Flexible Substrate", Scientific Reports, vol. 8, No. 8891, 2018, pp. 1-13.

Sara E. Skrabalak, et al., "Gold Nanocages: Synthesis, Properties, and Applications", Acc. Chem. Res., vol. 41, No. 12, Dec. 2018, pp. 1587-1595.

Andrea Speltini, et al., "Rationalization of hydrogen production by bulk g-$C_3N_4$: an in-depth correlation between physico-chemical parameters and solar light photocatalysis", RSC Advances, vol. 8, Nov. 26, 2018, pp. 39421-39431.

Xuping Sun, et al., "Large-Scale Synthesis of Micrometer-Scale Single-Crystalline Au Plates of Nanometer Thickness by a Wet-Chemical Route", Angewandte Chemie Int. Ed., vol. 116, 2004, pp. 6520-6523.

Tahmineh Tamiji, et al., "Study of kinetics aspects of the electrocatalytic oxidation of benzyl alcohol in aqueous solution on AgBr modified carbon paste electrode", Materials Chemistry and Physics, vol. 237, 2019, 7 pages.

Anika E. Wagner, et al., "Free Radical Scavenging and Antioxidant Activity of Ascorbigen Versus Ascorbic Acid: Studies in Vitro and in Cultured Human Keratinocytes", Journal of Agricultural and Food Chemistry, vol. 56, No. 24, 2008, pp. 11694-11699.

Peng Wang, et al., "PtNi Alloy Cocatalyst Modification of Eosin Y-Sensitized g-$C_3N_4$/GO Hybrid for Efficient Visible-Light Photocatalytic Hydrogen Evolution", Nanoscale Research Letters, vol. 13, No. 33, 2018, 9 pages.

Xuhong Wang, et al., "In situ decomposition-thermal polymerization method for the synthesis of Au nanoparticle-decorated g-$C_3N_4$ nanosheets with enhanced sunlight-driven photocatalytic activity", J. Nanoparticle Res., vol. 21, No. 192, 2019, 10 pages.

Xinchen Wang, et al., "A metal-free polymeric photocatalyst for hydrogen production from water under visible light", Nature Materials, vol. 8, Jan. 2009, pp. 76-80.

Peter Wardman, "Reduction Potentials of One-Electron Couples Involving Free Radicals in Aqueous Solution", Journal of Physical and Chemical Reference Data, vol. 18, No. 4, 1989, pp. 1637-1755.

Zhihua Xu, et al., "Enhancement of ethanol electrooxidation on plasmonic Au/$TiO_2$ nanotube arrays", Electrochemistry Communications, vol. 13, 2011, pp. 1260-1263.

Jing Zhao, et al., "Methods for Describing the Electromagnetic Properties of Silver and Gold Nanoparticles", Accounts of Chemical Research, vol. 41, No. 12, Dec. 2008, pp. 1710-1720.

Min Zhou, et al., "$Fe(Cn)_6^{-4}$-doped polypyrrole: a high-capacity and high-rate cathode material for sodium-ion batteries", RSC Advances, vol. 2, Apr. 18, 2012, pp. 5495-5498.

Xiaosong Zhou, et al., "A carbon nitride/$TiO_2$ nanotube array heterojunction visible-light photocatalyst: synthesis, characterization, and photoelectrochemical properties", Journal of Materials Chemistry, vol. 22, Aug. 2012, pp. 17900-17905.

Chengzhou Zhu, et al., "In situ loading of well-dispersed gold nanoparticles on two-dimensional graphene oxide/$SiO_2$ composite nanosheets and their catalytic properties", Nanoscale, vol. 4, Jan. 30, 2012, pp. 1641-1646.

* cited by examiner

CONDUCTING POLYMER AND CARBON NITRIDE BASED NANOCOMPOSITE PHOTOCATALYST FOR DEGRADATION OF AQUEOUS ORGANIC POLLUTANTS

STATEMENT OF PRIOR DISCLOSURE BY THE INVENTORS

Aspects of this technology are described in the article "Au Nanoparticles Decorated Polypyrrole-Carbon Black/g-$C_3N_4$ Nanocomposite as Ultrafast and Efficient Visible Light Photocatalyst" published in Chemosphere 2022, Vol 287, 131984, available on Aug. 21, 2021, which is incorporated herein by reference in its entirety.

BACKGROUND OF THE INVENTION

Field of the Invention

The present disclosure relates to a nanocomposite photocatalyst comprising carbon nitride particles, a polymer composite comprising a conducting polymer and a carbon nanomaterial, and noble metal nanoparticles, a method of forming the nanocomposite photocatalyst, and a method of photodegrading an organic pollutant in water using the nanocomposite photocatalyst.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The release of hazardous substances, such as insecticides, herbicides, colored dyes, untreated laboratory run-offs, phenolic compounds, petroleum byproducts, etc., into the environment can have extremely detrimental effects on the health of humans and the native species of plants and animals. Contamination of, for example, soil and groundwater, has caused a critical need for ways of dealing with such pollutants [Farah, M. A., et. al., Chemosphere, 2004, 55, 257]. Treatment procedures like adsorption, flocculation, and precipitation are disadvantageous as these tactics simply transfer the pollutants from one phase to another instead of completely eradicating them. For example, the flocculated hazardous material just forms a solid hazardous material which must be disposed of. Further, treatments such as chemical oxidation or biological methods frequently require vast amounts of reagents, which can be reactive or hazardous substances themselves, and are typically slow or inefficient. One promising treatment method for the degradation of complex and/or stable (persistent) organic pollutants involves semiconductor facilitated photocatalytic treatment [Faisal, M., et. al., Appl. Surf. Sci., 2011, 258, 672-677; Faisal, M., et. al., J. Mol. Struct., 2018, 1173, 428; Nezamzadeh-Ejhieh, A., & Khorsandi, M., J. Hazard Mater., 2010 176, 629-637; and Nezamzadeh-Ejhieh, A., & Shirzadi, A., Chemosphere, 2014, 107, 136-144]. Briefly, when a semiconductor is exposed to light source of equal or higher photon energy than the band gap energy, this results in generation of electron-hole pairs on the catalyst surface. The photogenerated holes ($h^+$) can oxidize $H_2O$ or $OH^-$ to $\cdot OH$ and the photo-generated electrons can combine with $O_2$ to produce superoxide radical ions ($O_2^-\cdot$). These reactive species can react with pollutant molecules and disintegrate them into harmless substances such as $CO_2$ and $H_2O$.

An ideal photocatalyst would be one which works efficiently under visible light, has high photocatalytic and material stability, proper band-gap engineering, and rapid generation of reactive species. Among various semiconductors, various inorganic materials such as ZnO and $TiO_2$ have been widely used as photocatalysts. However, factors such as low surface area, poor adsorption ability (~2-3% of sun light), high recombination rate of electron-hole pair limit their utilization. Recently, organic semiconductors have been investigated for applications such as hydrogen storage, solar energy harvesting, hydrogen generation, and photovoltaic sensing. (Wang, X., et. al., Nat. Mater., 2009, 8, 76.; Speltini, A., et. al., RSC Adv., 2018, 8, 39421]. Unfortunately, many polymeric semiconductors have an incredibly rapid recombination rate of the photo-generated charged species i.e. electron/hole pairs, very low surface area for the generation of reactive species, and limited adsorption in the visible spectrum range of 420-460 nm, which results in limited applications.

The creation of coupled photocatalysts or heterojunctions may increase the efficiency and performance of such a composite photocatalyst. Combining different semiconductors or a semiconductor and a non-semiconductor component may improve the absorption energy requirements, lengthen the charge separation time, and/or facilitate charge separation or transfer to a catalytically active component of such a composite.

Accordingly it is one objective of the present disclosure to provide a nanocomposite photocatalyst comprising materials which may be useful for overcoming the limitations and disadvantages discussed above. Such a nanocomposite photocatalyst may be useful in the degradation or destruction of organic pollutants.

SUMMARY OF THE INVENTION

The present disclosure relates to a nanocomposite photocatalyst, comprising carbon nitride particles, a polymer composite comprising a conducting polymer and a carbon nanomaterial, the polymer composite being disposed on the carbon nitride particles, and noble metal nanoparticles disposed on both the polymer composite and the carbon nitride particles.

In some embodiments, the carbon nitride particles are present in an amount of 80 to 94.9 wt %, based on a total weight of nanocomposite photocatalyst.

In some embodiments, the carbon nitride particles are graphitic carbon nitride (g-$C_3N_4$).

In some embodiments, the carbon nitride particles have a mean particle size of 100 to 300 nm, are crystalline by PXRD, and have a mean crystallite size of 5 to 15 nm.

In some embodiments, the polymer composite is present in an amount of 5 to 15 wt %, based on a total weight of nanocomposite photocatalyst.

In some embodiments, the conducting polymer is polypyrrole.

In some embodiments, the carbon nanomaterial is carbon black.

In some embodiments, the polymer composite comprises 10 to 30 wt % carbon nanomaterial, with the balance being the conducting polymer, based on a total weight of polymer composite.

In some embodiments, the noble metal nanoparticle are gold nanoparticles having a mean particle size of 2 to 20 nm, are crystalline by PXRD, and have a mean crystallite size of 1 to 10 nm.

In some embodiments, the nanocomposite photocatalyst has a mean surface area of 105 to 140 m$^2$/g, a mean pore size of 20 to 37.5 nm, and a mean pore volume of 0.6 to 1.1 cm$^3$/g.

The present disclosure also relates to a method of forming the nanocomposite photocatalyst, the method comprising, mixing carbon nitride particles and the polymer composite in a first solvent to form a first mixture, ultrasonically treating the first mixture to form a first solid, isolating, washing, and drying the first solid to form a first product, mixing the first product and a noble metal precursor in a second solvent to form a second mixture, ultrasonically treating the second mixture to form the nanocomposite, and optionally isolating the nanocomposite.

In some embodiments, the carbon nitride particles are produced by pyrolyzing urea at 450 to 650° C. for 1 to 6 hours to form a solid carbon nitride and milling the solid carbon nitride to produce the carbon nitride particles.

In some embodiments, the polymer composite comprises 10 to 30 wt % carbon nanomaterial, with the balance being the conducting polymer, based on a total weight of polymer composite.

In some embodiments, the conducting polymer is polypyrrole and the carbon nanomaterial is carbon black.

In some embodiments, the noble metal precursor is chloroauric acid or a salt thereof.

The present disclosure also relates to a method of photodegrading an organic pollutant, the method comprising irradiating a photodegradation mixture comprising the organic pollutant, the nanocomposite photocatalyst, and water with visible light.

In some embodiments, the irradiating is performed with an irradiation intensity 10 to 50 W/cm$^2$.

In some embodiments, the nanocomposite photocatalyst is present in the photodegradation mixture in an amount of 0.1 to 10 g/L.

In some embodiments, the organic pollutant is imidacloprid and the method degrades greater than 90% of an initial amount of the organic pollutant after 17.5 to 37.5 minutes.

In some embodiments, the irradiating produces a reactive species comprising hydroxyl radicals, the reactive species then reacting with the organic pollutant.

BRIEF DESCRIPTION OF THE DRAWINGS

FIG. 3A is a wide-scan (survey spectrum), FIG. 3B is narrow-high resolution scan XPS spectra of the Au4f region, FIG. 3C is a narrow-high resolution scan XPS spectra of the C1s region, FIG. 3D is a narrow-high resolution scan XPS spectra of the O1s region, and FIG. 3E is a narrow-high resolution scan XPS spectra of the N1s region.

FIG. 8C shows a plot of the determination of the first order rate constant and FIG. 8D shows a bar graph comparison of the rate constant.

DETAILED DESCRIPTION OF THE INVENTION

Figure 1A:
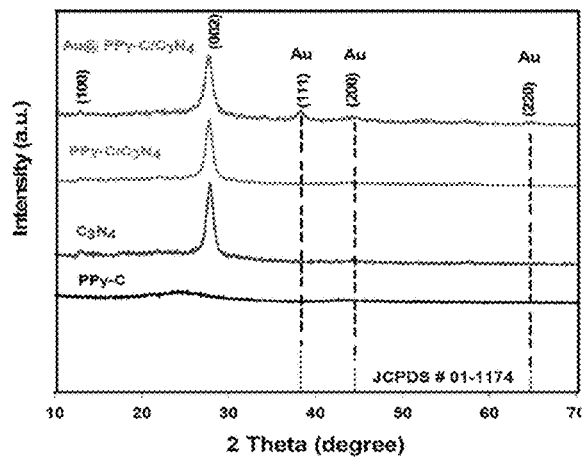
FIG. 1A shows PXRD patterns of PPy-C, pure g-C$_3$N$_4$, PPy-C/g-C$_3$N$_4$, and Au@PPy-C/g-C$_3$N$_4$ nanocomposite photocatalysts.

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean size of the primary particles.

As used herein, the term "noble metal" refers to a metallic element selected from the group consisting of gold, platinum, palladium, ruthenium, rhodium, osmium, silver, copper, mercury, rhenium, iridium, and alloys thereof. Examples of copper alloys include, but are not limited to gilding metal; Muntz metal; beryllium copper; nickel silver; cupronickel; Dunce metal; bronzes such as manganese bronze, tin bronze, leaded tin bronze, aluminum bronze, silicon bronze, phosphor bronze, commercial bronze, architectural bronze, mild bronze, bell metal, arsenical bronze, speculum metal, and cymbal alloy; and brasses such as Abyssinian gold, admiralty brass, Aich's alloy, aluminum brass, arsenical brass, cartridge brass, common brass, DZR brass, delta metal, free machining brass, high brass, leaded brass, low brass, manganese brass, naval brass, nickel brass, Nordic gold, drichalcum, Prince's metal, red brass (also known as gunmetal), tombac, silicon tombac, tonval brass, and yellow brass. Other exemplary alloys include gold alloys with copper and silver (colored gold, crown gold, electrum), gold alloys with rhodium (rhodite), gold alloys with copper (rose gold, tumbaga), gold alloys with nickel and palladium (white gold), gold alloys including the addition of platinum, manganese, aluminum, iron, indium and other appropriate elements or mixtures thereof, silver alloys with copper (shibuichi, sterling silver, Tibetan silver, Britannia silver), silver alloys with copper and gold (goloid), silver alloys with copper and germanium (argentium sterling silver), silver alloys with platinum (platinum sterling), silver alloys with copper (silver graphite), silver alloys including the addition of palladium, zinc, iridium, and tin and other appropriate elements or mixtures thereof, platinum alloys with gold, platinum alloys with cobalt, platinum alloys with rare earth elements, and platinum alloys with nickel.

Nanocomposite Photocatalyst

According to a first aspect, the present disclosure relates to a nanocomposite photocatalyst, comprising carbon nitride particles, a polymer composite comprising a conducting polymer and a carbon nanomaterial, the polymer composite being disposed on the carbon nitride particles, and noble metal nanoparticles disposed on both the polymer composite and the carbon nitride particles.

The particles of carbon nitride are formed from a covalent network. This covalent network is distinct from molecular carbon nitride substances, such as azafullerenes, cyanofullerenes, percyanoalkynes, percyanoalkenes, percyanoalkanes, percyanoheterocycles, and the like. Covalent network carbon nitride has a formula of $C_3N_4$ and exists in a variety of solid structures, such as graphitic-$C_3N_4$ (g-$C_3N_4$), cubic-$C_3N_4$, defect zinc blende-$C_3N_4$, β-$C_3N_4$, and α-$C_3N_4$. Covalent network carbon nitride may also be characterized by the ratio of N to C. If the N/C ratio is <~1.25, the carbon nitride is typically called N-doped $C_3N_4$. Such a material contains C atoms as the main phase in which the N atoms are substituted and/or bound as N-comprising functional groups onto the C atoms. If the N/C ratio is >~1.25, the carbon nitride is usually named N-rich $C_3N_4$. In general, the carbon nitride may adopt any suitable solid structure and/or have any suitable N/C ratio.

In some embodiments, the carbon nitride is graphitic carbon nitride (g-$C_3N_4$). Graphitic carbon nitride exists as sheets of hexagonal arrangements of carbon and nitrogen, the sheets stacking in layers to form a structure similar to that of graphite. The carbon nitride particles may have a spherical shape, or may be shaped like blocks, flakes, ribbons, discs, granules, platelets, angular chunks, rectangular prisms, or some other shape. In some embodiments, the particles of carbon nitride exist as nanosheets. Nanosheets may consist of stacks of carbon nitride sheets, the stacks having an average thickness and a diameter. In some embodiments, the stacks comprise 1 to 60 sheets of carbon nitride, preferably 2 to 55 sheets of carbon nitride, preferably 3 to 50 sheets of carbon nitride. In some embodiments, the carbon nitride particles may be in the form of agglomerates.

In some embodiments, the particles of carbon nitride is present in the form of sheets having a mean thickness of 5 to 150 nm, preferably 7.5 to 125 nm, preferably 10 to 100 nm, preferably 15 to 75 nm, preferably 20 to 60 nm, preferably 25 to 55 nm, preferably 30 to 50 nm and a mean width of 100 to 300 nm, preferably 110 to 290 nm, preferably 120 to 280 nm, preferably 130 to 270 nm, preferably 140 to 260 nm, preferably 150 to 250 nm. In some embodiments, the sheets have a monodisperse thickness, having a coefficient of variation or relative standard deviation, expressed as a percentage and defined as the ratio of the sheet thickness standard deviation (σ) to the sheet thickness mean (μ), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation (σ) to the sheet diameter mean (μ), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

In some embodiments, the carbon nitride particles are crystalline by PXRD. In some embodiments, the carbon nitride particles have a mean crystallite size of 5 to 15 nm, preferably 5.5 to 14 nm, preferably 6 to 13 nm, preferably 6.5 to 12 nm, preferably 7 to 11 nm, preferably 7.5 to 10 nm, preferably 8 to 9 nm.

In some embodiments, the carbon nitride particles are present in an amount of 80 to 94.9 wt %, preferably 81 to 94.5 wt %, preferably 82 to 94 wt %, preferably 83 to 93.5 wt %, preferably 84 to 93 wt %, preferably 85 to 92.5 wt %, preferably 86 to 92 wt %, preferably 86.5 to 91.5 wt %, preferably 87 to 91 wt %, preferably 87.5 to 90.5 wt %, preferably 88 to 90 wt %, preferably 88.5 to 89.5, preferably 89 wt %, based on a total weight of nanocomposite photocatalyst.

The polymer composite comprises a conducting polymer and a carbon nanomaterial.

In general, the conducting polymer may be any suitable conducting polymer known to one of ordinary skill in the art. Examples of conducting polymers include, but are not limited to polyaniline (PANT), polypyrrole (PPy), polythiophene (PTh), polyphenylene sulfide (PPS), polyacetylene (PA), polyphenylene vinylene (PPV), poly(3,4-ethylenedioxythiophene) (PEDOT), polycarbazole (PCz), polyindole (PIn), polyazepine, polypyrene (PP), polyazulene (PAz), polynaphthalene, poly(para-phenylene) (PPP), poly (3-alkyl-thiophenes) such as poly (3-hexyl thiophene), poly (3-methyl thiophene) and poly-(3-octyl thiophene), polyisothianapthene, poly-(3-thienylmethylacetate), polyquinoline, polyheteroarylenvinylene, in which a heteroarylene group may include, but is not limited to, a thiophene, a furan or a pyrrole, poly-(3-thienylethylacetate), and derivatives, copolymers and combinations thereof. In preferred embodiments, the conducting polymer is polypyrrole (PPy).

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of carbon black, graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 m$^2$/g. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 m$^2$/g for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

In preferred embodiments, the carbon nanomaterial is carbon black.

In some embodiments, the polymer composite comprises 10 to 30 wt %, preferably 12.5 to 27.5 wt %, preferably 15 to 25 wt %, preferably 16 to 24 wt %, preferably 17 to 23 wt %, preferably 18 to 22 wt %, preferably 18.5 to 21.5 wt %, preferably 19 to 21 wt %, preferably 19.25 to 20.75 wt %, preferably 19.5 to 20.5 wt %, preferably 19.75 to 20.25 wt %, preferably 20 wt % carbon nanomaterial, with the balance being the conducting polymer, based on a total weight of polymer composite.

In some embodiments, the polymer composite is present in an amount of 5 to 15 wt %, preferably 5.5 to 14.5 wt %, preferably 6 to 14 wt %, preferably 6.5 to 13.5 wt %, preferably 7 to 13 wt %, preferably 7.5 to 12.5 wt %, preferably 8 to 12 wt %, preferably 8.5 to 11.5 wt %, preferably 9 to 11 wt %, preferably 9.25 to 10.75 wt %, preferably 9.5 to 10.5 wt %, preferably 9.75 to 10.25 wt %, preferably 10 wt %, based on a total weight of nanocomposite photocatalyst.

In general, the noble metal nanoparticles can be any shape known to one of ordinary skill in the art. Examples of suitable shapes the noble metal nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For noble metal nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the noble metal nanoparticles are envisioned as having in any embodiments.

In some embodiments, the noble metal nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of metal oxide nanoparticles having a different shape. As used herein, the term "non-uniform shape" refers to an average consistent shape that differs by more than 10% of the distribution of metal oxide nanoparticles having a different shape. In one embodiment, the shape is uniform and at least 90% of the noble metal nanoparticles are spherical or substantially circular, and less than 10% are polygonal. In another embodiment, the shape is non-uniform and less than 90% of the noble metal nanoparticles are spherical or substantially circular, and greater than 10% are polygonal.

In some embodiments, the noble metal nanoparticles have a mean particle size of 2 to 20 nm, preferably 3 to 18 nm, preferably 4 to 16 nm, preferably 5 to 15 nm. In embodiments where the noble metal nanoparticles are spherical, the particle size may refer to a particle diameter. In embodiments where the noble metal nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the noble metal nanoparticles have an anisotropic shape such as nanorods, the particle size may refer to a length of the nanorod, a width of the nanorod, an average of the length and width of the nanorod. In some embodiments in which the noble metal nanoparticles have non-spherical shapes, the particle size refers to the diameter of a sphere having an equivalent volume as the particle. In some embodiments in which the noble metal nanoparticles have non-spherical shapes, the particle size refers to the diameter of a sphere having an equivalent diffusion coefficient as the particle.

In some embodiments, the noble metal nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the noble metal nanoparticles of the present disclosure are monodisperse having a particle size distribution ranging from 80% of the average particle size to 120% of the average particle size, preferably 90-110%, preferably 95-105% of the average particle size. In some embodiments, the noble metal nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the noble metal nanoparticles are crystalline by PXRD. In some embodiments, the noble metal nanoparticles have a mean crystallite size of 1 to 10 nm, preferably 2 to 9 nm, preferably 3 to 8 nm, preferably 4 to 7 nm. In some embodiments, the noble metal nanoparticles are crystalline by high resolution transmission electron microscopy (HR-TEM). In HR-TEM, crystallinity can be confirmed by the presence of lattice fringes. In some embodiments, the noble metal nanoparticles are crystalline by electron diffraction. In some embodiments, the noble metal nanoparticles are not crystalline. In some embodiments, the noble metal nanoparticles comprise nanoparticles which are crystalline and nanoparticles which are not crystalline. In preferred embodiments, the noble metal nanoparticles are gold nanoparticles.

In some embodiments, the nanocomposite photocatalyst has a mean surface area of 105 to 140 m$^2$/g, preferably 107.5 to 137.5 m$^2$/g, preferably 110 to 135 m$^2$/g, preferably 112.5 to 132.5 m$^2$/g, preferably 115 to 130 m$^2$/g, preferably 117.5 to 127.5 m$^2$/g, preferably 120 to 125 m$^2$/g, preferably 121 to 124 m$^2$/g, preferably 122 to 123 m$^2$/g.

In some embodiments, the nanocomposite photocatalyst has a mean pore size of 20 to 37.5 nm, preferably 20.5 to 36.5 nm, preferably 21 to 35.5 nm, preferably 21.5 to 35 nm, preferably 22 to 34.5 nm, preferably 22.5 to 34 nm, preferably 23 to 33.5 nm, preferably 23.5 to 33 nm, preferably 24 to 32.5 nm, preferably 24.5 to 32 nm, preferably 25 to 31.5 nm, preferably 25.5 to 31 nm, preferably 26 to 30.5 nm, preferably 26.5 to 30 nm, preferably 27 to 29.5 nm, preferably 27.5 to 29 nm, preferably 28 to 28.5 nm.

In some embodiments, the nanocomposite photocatalyst has a mean pore volume of 0.6 to 1.1 cm$^3$/g, preferably 0.650 to 1.050 cm$^3$/g, preferably 0.70 to 1.025 cm$^3$/g, preferably 0.725 to 1.00 cm$^3$/g, preferably 0.75 to 0.975 cm$^3$/g, preferably 0.775 to 0.95 cm$^3$/g, preferably 0.80 to 0.925 cm$^3$/g, preferably 0.825 to 0.90 cm$^3$/g, preferably 0.85 to 0.875 cm$^3$/g, preferably 0.86 to 0.87 cm$^3$/g.

In some embodiments, the nanocomposite photocatalyst has a band gap of 2.40 to 2.80 eV, preferably 2.425 to 2.775 eV, preferably 2.45 to 2.75 eV, preferably 2.475 to 2.725 eV, preferably 2.50 to 2.70 eV, preferably 2.525 to 2.675 eV, preferably 2.55 to 2.65 eV, preferably 2.575 to 2.625 eV, preferably 2.60 eV.

Method of Forming the Nanocomposite Photocatalyst

The present disclosure also relates to a method of forming the nanocomposite photocatalyst, the method comprising, mixing carbon nitride particles and the polymer composite in a first solvent to form a first mixture, ultrasonically treating the first mixture to form a first solid, isolating, washing, and drying the first solid to form a first product, mixing the first product and a noble metal precursor in a second solvent to form a second mixture, ultrasonically treating the second mixture to form the nanocomposite, and optionally isolating the nanocomposite.

In some embodiments, the first solvent comprises water. In some embodiments, the first solvent further comprises an organic solvent miscible with water. Examples of organic solvents miscible with water include, but are not limited to acetic acid, acetone, acetonitrile, dimethylsulfoxide (DMSO), dioxane, ethanol, isopropanol (also known as 2-propanol), 1-propanol (also known as n-propanol), methanol, tetrahydrofuran, dimethylformamide, glycerol, acetaldehyde, 1,2-butanediol, 1,3-butanediol, 1,4-butanediol, 2-butoxyethanol, diethanolamine, diethylenetriamine, dimethoxyethane, ethylamine, ethylene glycol, formic acid, furfuryl alcohol, methyl diethanolamine, methyl isocyanide, 1,3-propanediol, 1,5-pentanediol, and propylene glycol. In preferred embodiments, the first solvent is water. In some embodiments, the second solvent comprises water. In some embodiments, the second solvent further comprises an organic solvent miscible with water. In some embodiments, the second solvent is water.

In some embodiments, the carbon nitride particles are produced by pyrolyzing urea at 450 to 650° C., preferably 460 to 640° C., preferably 470 to 630° C., preferably 480 to 620° C., preferably 490 to 610° C., preferably 500 to 600° C., preferably 510 to 590° C., preferably 520 to 580° C., preferably 530 to 570° C., preferably 540 to 560° C., preferably 550° C. for 1 to 6 hours, preferably 1.5 to 5 hours, preferably 2 to 4 hours, preferably 2.25 to 3.75 hours, preferably 2.5 to 3.5 hours, preferably 2.75 to 3.25 hours, preferably 3 hours to form a solid carbon nitride and milling the solid carbon nitride to produce the carbon nitride particles. The pyrolyzing may take place under ambient atmosphere or under an inert atmosphere. Such an inert atmosphere may be provided by any suitable gas, such as nitrogen, argon, neon, and helium. The pyrolyzing may take place at ambient pressure or at elevated pressure. The atmosphere may be static or may be flowing.

In general, the milling may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles.

In some embodiments, the polymer composite comprises 10 to 30 wt % carbon nanomaterial, preferably 12.5 to 27.5 wt %, preferably 15 to 25 wt %, preferably 16 to 24 wt %, preferably 17 to 23 wt %, preferably 18 to 22 wt %, preferably 18.5 to 21.5 wt %, preferably 19 to 21 wt %, preferably 19.25 to 20.75 wt %, preferably 19.5 to 20.5 wt %, preferably 19.75 to 20.25 wt %, preferably 20 wt % carbon nanomaterial with the balance being the conducting polymer, based on a total weight of polymer composite, as described above. In some embodiments, the conducting polymer is polypyrrole and the carbon nanomaterial is carbon black, as described above. In general, the polymer composite may be formed by any suitable technique(s) known to one of ordinary skill in the art. For example, the polymer composite may be formed by mixing. Such mixing may involve melt mixing or melt blending, in which the conducting polymer is in a molten or liquid state, the carbon nanomaterial is introduced as a solid, and the polymer composite is formed by mixing these components before the polymer is allowed to solidify. Such mixing may involve solution mixing, in which the conducting polymer is dissolved in a suitable solvent, the carbon nanomaterial is added, the ingredients are mixed, and the solvent is removed, for example by evaporation. In solution mixing, the carbon nanomaterial may be added as a solid, or may be added as a colloid, suspension, or other similar dispersion in a liquid. Such mixing may involve in-situ formation. That is, the conducting polymer or the carbon nanomaterial may be formed in the presence of the other component. For example, the conducting polymer may be formed by a polymerization reaction which takes place in the presence of the carbon nanomaterial such that the carbon nanomaterial is incorporated with the conducting polymer as it forms.

In some embodiments, the noble metal is gold. That is, the noble metal precursor is a gold precursor and the noble metal nanoparticles are gold nanoparticles. In some embodiments, the gold precursor is a gold salt. Examples of gold salts include, but are not limited to, chloroauric acid and salts thereof, gold chloride, tetrabromoauric acid and salts thereof, gold bromide, gold iodide, and nitroauric acid and salts thereof. In some embodiments, the noble metal source is chloroauric acid or a salt thereof.

Method of Photodegrading an Organic Pollutant

The present disclosure also relates to a method for of photodegrading an organic pollutant in water using the nanocomposite photocatalyst described above. In some embodiments, only one organic pollutant is present in the water. In alternative embodiments, a plurality of organic pollutants is present in the water. The method involves irradiating a photodegradation mixture comprising the organic pollutant, the nanocomposite photocatalyst, and water with visible light.

In some embodiments, the organic pollutants may be a dye, a phenol, a polycyclic aromatic hydrocarbon, an herbicide, a pesticide, a persistent organic pollutant a pharmaceutical compound, or the like.

In some embodiments, the organic pollutant is a pharmaceutical compound. Examples of pharmaceutical compounds include, but are not limited to fluticasone propionate, clonidine, triazolam, albuterol, ciclesonide, fentanyl, terbutaline, flumazenil, triamcinolone acetonide, flunisolide, ropinirole, alprazolam, buprenorphine, hyoscyamine, atropine, pramipexole, bumetanide, flunitrazepam, oxymorphone, colchicine, apomorphine HCl, granisetron, pergolide, nicotine, loperamide, azatadine, naratriptan, clemastine, benztropine, ibutilide, butorphanol, fluphenazine, estradiol-17-heptanoate, zolmitriptan, metaproterenol, scopolamine, diazepam, tolterodine, estazolam, haloperidol, carbinoxamine, estradiol, hydromorphone, bromazepam, perphenazine, midazolam, methadone, frovatriptan, eletriptan, testosterone, melatonin, galanthamine, cyproheptadine, bropheniramine, chlorpheniramine, ibuprofen, carbamazepine, atenolol, mefenamic acid, fluconazole, indomethacin, propranolol, ifenprodil, finofibric acid, fluoxetine, and trimethoprim.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, j anus green B, lithol rubine BK, metanil yellow, methyl orange, methyl red, methyl yellow, mordant brown 33, mordant red 19, naphthol AS, oil red 0, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, 0-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

The method comprises irradiating a photodegradation mixture comprising the organic pollutant, the nanocomposite photocatalyst, and water with visible light.

In some embodiments, the irradiating is performed with an irradiation intensity of 10 to 50 $W/cm^2$, preferably 12.5 to 47.5 $W/cm^2$, preferably 15 to 45 $W/cm^2$, preferably 17.5 to 42.5 $W/cm^2$, preferably 20 to 40 $W/cm^2$, preferably 22.5 to 37.5 $W/cm^2$, preferably 25 to 35 $W/cm^2$, preferably 27.5 to 32.5 $W/cm^2$, preferably 29 to 31 $W/cm^2$, preferably 30 $W/cm^2$.

In general, the irradiation with visible light may be performed by any suitable technique and/or with any suitable equipment (e.g. visible light source) known to one of ordinary skill in the art. In some embodiments, the visible light source is the sun. In some embodiments, the visible light source is an artificial light source. Examples of artificial light sources include, but are not limited to an incandescent lamp, an argon flash lamp, a carbide lamp, gas lighting, a kerosene lamp, an oil lamp, an arc lamp, a flashtube, a gas discharge lamp, an electrodeless lamp, an excimer lamp, a fluorescent lamp, a carbon arc lamp, a ceramic discharge metal-halide lamp, a mercury-vapor lamp, a sodium-vapor lamp, a xenon arc lamp, a neon lamp, a plasma lamp, an LED, a light-emitting electrochemical cell, an electroluminescent material, a laser including, but not limited to chemical, dye, free-electron, gas, ion, diode, metal-vapor, quantum well, ruby, and solid-state type lasers, and a deuterium arc lamp. In some embodiments, a single type of light source is used. In alternative embodiments, more than one type of light source is used. In some embodiments, the light source has a light output comprising visible light and a significant percentage (i.e. at least 5%, preferably at least 10% of a total energy output) of at least one selected from the group consisting of UV light and infrared light.

In some embodiments, the nanocomposite photocatalyst is present in the photodegradation mixture in an amount of 0.1 to 10 g/L, preferably 0.25 to 9 g/L, preferably 0.5 to 8 g/L, preferably 0.75 to 7 g/L, preferably 1.0 to 6 g/L, preferably 1.25 to 5.5 g/L, preferably 1.5 to 5 g/L, preferably 1.75 to 4.5 g/L, preferably 2.0 to 4 g/L, preferably 2.25 to 3.75 g/L, preferably 2.5 to 3.5 g/L, preferably 2.75 to 3.25 g/L, preferably 3.0 g/L.

In some embodiments, the organic pollutant is an insecticide compound having an othro-halopyridine. In some embodiments, the organic pollutant is an insecticide which is a neonicitinoid. As used herein, the term "neonicitinoid" refers to members of a class of neuro-active insecticides bearing a chemical similarity to nicotine. Similar to nicotine, neonicitinoids are capable of binding to the nicotinic acetylcholine receptors. In some embodiments, the neonicitinoid is imidacloprid. In some embodiments, the organic pollutant is imidacloprid and the method degrades greater than 90%, preferably greater than 90.5%, preferably greater than 91%, preferably greater than 91.5%, preferably greater than 92%, preferably greater than 92.5%, preferably greater than 93%, preferably greater than 93.5%, preferably greater than 94%, preferably greater than 94.5%, preferably greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99%, preferably greater than 99.5% of an initial amount of organic pollutant after 17.5 to 37.5 minutes, preferably 20 to 35 minutes, preferably 22.5 to 32.5 minutes, preferably 25 to 30 minutes.

As used herein, the term "degrading" an organic pollutant refers to chemically treating the organic pollutant with one or more reactive species such that the organic pollutant is transformed into a degraded structure which is not considered an organic pollutant. The degrading may involve breaking down the pollutant into atoms, ions, and/or smaller molecules (e.g., nitrogen gas, carbon dioxide, and water).

For example, degradation of the pollutant can include breaking existing covalent chemical bonds in the pollutant so as to change the physical and/or chemical properties of the pollutant. Such a degraded structure may be non-toxic, of little to no environmental concern, or easily utilized, destroyed, or otherwise remediated by natural processes. The degrading may involve chemical processes such as breaking of chemical bonds, particularly C—C bonds, C—N bonds, C—O bonds, C—H bonds, N—N bonds or combinations thereof. The preceding description of bonds refers only to the constituent atoms and not to the nature of the bond. For example, such bonds may be single bonds, double bonds, triple bonds, or any intermediate bond order. The degrading may involve oxidation or reduction of organic pollutants or certain functional groups present in the organic pollutants. Degradation which involves irradiation with light may be referred to as "photodegradation".

In general, the method may be performed as a batch process or a continuous process. In some embodiments, the method involves stirring or agitation. Such stirring or agitation may be performed using any suitable technique or with any suitable equipment (e.g. magnetic stirrer, mechanical stirrer, ultrasonic mixer, etc.) known to one of ordinary skill in the art. The nanocomposite photocatalyst may be formed into any suitable shape for use in the method. For example, the nanocomposite photocatalyst may be free flowing in the photodegradation mixture. That is, the nanocomposite photocatalyst may be dispersed, suspended, or otherwise present as particles in the photodegradation mixture. The nanocomposite photocatalyst may be present on a support. In such embodiments, the photodegradation solution may be flowed over or otherwise contacted with the nanocomposite photocatalyst present on the support.

In some embodiments, the method is performed under ambient atmosphere. In some embodiments, the method is performed under any suitable oxygen-containing atmosphere. In some embodiments, air or other suitable oxygen-containing gas may be added or introduced to the photodegradation mixture. Such addition may be achieved by, for example, bubbling through the photodegradation mixture.

In some embodiments, the nanocomposite photocatalyst is recovered after the method is performed. Such recovery may be performed by any suitable technique known to one of ordinary skill in the art for separating solids and liquids. Examples of such suitable techniques include, but are not limited to decantation, centrifugation, and filtration, but excluding techniques such as evaporation and distillation.

The examples below are intended to further illustrate protocols for preparing and characterizing the nanocomposite photocatalyst, as well as performing the method, and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

Examples

Materials
Urea, 20% polypyrrole doped with carbon black (CAS #30604-81-0), gold (III) chloride tetrahydrate ($HAuCl_4 \cdot 4H_2O$) and ethanol ($C_2H_5OH$) were purchased from Sigma-Aldrich (USA) and used as received.

Preparation of g-$C_3N_4$

Extremely fluffy and fine powder of g-$C_3N_4$ was achieved by a simple pyrolysis procedure exploiting dried urea as a precursor. Specifically, 10 g of urea was heated at 550° C. for 3 h in a covered crucible to get a fine fluffy yellow-colored light weighted product, which then ground to attain a homogenous powder for further preparation of nanocomposites. For additional details see Faisal, et. al., 2018 [Faisal, M., et. al., J. Mol. Struct., 2018, 1173, 428, incorporated herein by reference in its entirety.]

Preparation of PPy-C/g-$C_3N_4$ and Au@PPy-C/g-$C_3N_4$

Ultra-sonication procedure was put into application for the preparation of 10% PPy-C/g-$C_3N_4$ nanocomposites. Typically, 2 g of above-synthesized g-$C_3N_4$ and 0.2 g of PPy-C were mixed in 100 ml double-distilled water followed by ultra-sonication for 30 min. The resulting mixture was then filtered, washed (3-4 times) with distilled water and ethanol followed by drying in an oven at 65° C. for 24 h to get 10% PPy-C/g-$C_3N_4$. Afterward, for the synthesis of 1% Au@10% PPy-C/g-$C_3N_4$, typically 0.5 g of 10% PPy-C/g-$C_3N_4$ material was ultra-sonicated for 1 h at ambient conditions in 50 ml of water along with the calculated amount of $HAuCl_4$ solution to acquire the 1% Au doped 10% PPy-C/g-$C_3N_4$ nanocomposites. Later, the same step of washing, drying in an oven at 65° C. for 24 h as described above followed to obtain 1% Au@10% PPy-C/g-$C_3N_4$, which is referred to as Au@PPy-C/g-$C_3N_4$ nanocomposite herein.

Materials Characterization

Bruker AXS D4 Endeavour X diffractometer was used for X-ray diffraction (XRD) analysis generating Cu K$\alpha_{1/2}$, $\lambda\alpha_1$=154.060 p.m., $\lambda\alpha_2$=154.439 p.m. radiation. Surface associated morphological examinations and chemical investigations were performed on field emission-secondary electron microscope (FE-SEM) fitted with FE scanning electron microanalyzer (JEOL-6300F, 5 kV) and on (JEOL JEM-2100F-UHR field-emission) transmission electron microscope (TEM) functional at 200 kV fixed with a 1 k-CCD camera and Gatan GIF 2001 energy filter. PerkinElmer Raman Station 400 spectrometer was used to conduct FTIR analysis (ranging from 400 to 4000 $cm^{-1}$) in KBr pellet dispersion mode. VGESCALAB 200R spectrometer was used to conduct X-ray photoelectron spectroscopy (XPS) examinations having MgK$\alpha$ (hv=1253.6 eV) nonmonochromatic X-ray source and a hemispherical electron analyzer. During the preliminary treatment process, all newly synthesized samples, before shuffling to the instrument's ultra-high vacuum analysis chamber, were degassed in a pretreatment chamber at room temperature for 1 h. All the samples have also gone through photoluminescence (PL) spectral analysis recorded at excitation wavelength of 325 nm using a Xenon lamp conducted on Hitachi fluorescence spectrophotometer F-7000 (Japan). Each sample was prepared by dispersing 20 mg of photocatalyst in 50 ml of pure water. Quantachrome NOVA 4200 analyzer at 77 K was utilized to examine the nitrogen adsorption isotherm. All samples were degassed at 200° C. overnight. The surface area measurement was done by Brunauer-Emmett-Teller (BET) method utilizing the adsorption data. Barrett-Joyner-Halenda (BJH) model with Halsey equation was used to analyze the sorption data. UV-Vis spectrophotometer (Shimadzu: UV-3600 plus) was used to acquired diffuse reflectance spectra of all newly fabricated samples in the range of 200-800 nm. Attained data from diffuse reflectance spectra utilized for Kubelka-Munk function $[F(R) E]^2$ vs. absorbed light energy E plot to determine the band-gap energy ($E_g$) utilizing the below-mentioned Equation (1) [see Azimi, S., & Nezamzadeh-Ejhieh, A., J. Molecul. Catal. A: Chem., 2015, 408, 152; and Khodami, Z., & Nezamzadeh-Ejhieh, A., J. Molecul. Catal. A: Chem., 2015, 409, 59, each of which is incorporated herein by reference in its entirety].

$$F(R)E^2 = \left(\frac{(1-R)^2}{2R} \times h\nu\right)^2 \quad (1)$$

Photocatalytic Experiments

The photocatalytic destruction performance of each newly designed photocatalyst was investigated busing imidacloprid ((EZ)-1-(6-chloro-3-pyridylmethyl)-N-nitroimidazolidin-2-ylideneamine), a pyridine-based frequently used insecticide and methylene blue dye (MB: commonly used colored dye molecule) under visible-light. All experiments have been carried out in a quartz glass photo-reactor (150 ml) procured from Lelesil innovative systems (India) mounted on a magnetic stirrer. The reaction setup was equipped with a controlled water-circulating system to avoid any kind of over-heating or to cool the photo-reactor during the progression of the reaction. The photoreaction assembly was provided with vents for continuous air supply required for ongoing photocatalytic experiments. Typically, for each reaction, 0.3 g of synthesized photocatalytic material was poured into a 100 ml solution of imidacloprid (concentration: 20 ppm). To account for adsorption factor or any loss due to adsorption of target pollutant, the resulting solution (photocatalyst+insecticide solution) was kept in dark for 30 min. For each investigation, irradiation was carried out using a 250W visible-light source with an intensity 30 w/cm². Before absorbance measurement, each withdrawn sample (5 ml) was centrifuged at least two times to ensure the complete separation and removal of photocatalyst from the target analyte. The UV-vis absorption spectra were measured at $\lambda=270$ nm for imidacloprid (concentration=20 ppm) and at $\lambda=663$ nm for MB (concentration=0.02 mM). The photocatalytic performance of each designed photocatalyst was evaluated utilizing the below-mentioned Equation (2):

$$\% \text{ Photocatalyic Removal of Target Analyte} = \left[\frac{c_0 - c_t}{c_0}\right] \times 100 \quad (2)$$

Where $C_0$ indicates the initial concentration and $C_t$ represents the concentration at a particular irradiation time t.

Photo-Electrochemical Experiments

To explore the photo-electrochemical behavior of synthesized material, functional electrodes were fabricated adopting the following procedure. Briefly, 10 mg of prepared material was carefully mixed in isopropanol (900 µl) and Nafion (100 µl) solution to obtain a homogenous suspension. 4 µl of the homogenous suspension was dispersed in the form of a uniform layer on cleaned glassy carbon (GC) electrode followed by drying in an oven at 60° C. for 30 min. The photo-electrochemical tests were performed on three electrode-supported electrochemical workstation (Zahner Zennium, Germany). KCL saturated Ag/AgCl electrode was taken as a reference, whereas a Pt wire was considered as a counter electrode. In addition to this, 0.1 M $Na_2SO_4$ solution was taken as an electrolyte for each analysis. GE manufactured 400 W lamp (visible-light source) was used as an illuminating source to determine the response of the modified electrodes with synthesized material under the light.

Structural Investigation of Au@PPy-C/g-$C_3N_4$ Nanocomposites

FIG. 1A shows the XRD analysis to study the purity, phase identification and crystallinity of the materials. The XRD diffraction pattern of PPy-C revealed a single broad peak at $2\theta=25.10°$, signifying the overlapping of amorphous PPy with carbon network [Das, E., & Yurtcan, A. B., Int. J. Hydrogen Energy, 2016, 41, 13171, incorporated herein by reference in its entirety]. Two distinct peaks appearing at $2\theta=12.75°$ and $27.6°$ in the case of pure $C_3N_4$ are indexed to diffraction planes (100) and (002) of graphitic nitride [Samanta, S., et. al., ChemCatChem, 2014, 6, 1453, incorporated herein by reference in its entirety]. The XRD pattern of PPy-C/g-$C_3N_4$ displays an almost identical diffraction pattern like that of bare g-$C_3N_4$ without any additional peak related to PPy-C, probably due to dispersion of PPy-C into the g-$C_3N_4$. In the case of Au@PPy-C/g-$C_3N_4$ nanocomposite sample, XRD diffraction pattern showed three different peaks appearing at $38.10°$, $44.2°$, and $64.62°$ corresponding respectively to (111), (200) and (220) crystal planes confirming the presence of Au NPs (JCPDS #01-1174) [Fang, J., et. al., Int. J. Hydrogen Energy, 2012, 37, 17853, incorporated herein by reference in its entirety]. Obtained XRD results confirmed the successful development of the nanocomposite framework comprising Au, PPy-C and g-$C_3N_4$. No additional peaks corresponding to any kind of impurity during XRD measurement could be detected, demonstrating the pure composite formation among the selected moieties. From the XRD results, the impact of crystallite size on peak broadening was examined by the Scherrer and the Williamson-Hall equations using the result of the Au@PPy-C/g-$C_3N_4$ sample. Equation (3) shows the Scherer equation:

$$D = \frac{K\lambda}{\beta}\cos\theta \quad (3)$$

D (nm) represents crystallite size, k is Scherer constant (the most common value is 0.9, depending on the crystallite shape), $\lambda$ is X-ray wavelength (here Cu—K$\alpha$ line is 0.15406 nm), $\beta$ is the full width at the half maximum of the peak (FWHM), and $\theta$ is the half of diffraction angle [Tamiji, T., & Nezamzadeh-Ejhieh, A., Mater. Chem. Phys., 2019, 237, 121813; and Norouzi, A., & Nezamzadeh-Ejhieh, A., Chem. Phys. Lett., 2020, 752, 137587, each of which is incorporated herein by reference in its entirety]. The average crystallite size obtained by Scherer equation for Au@PPy-C/g-$C_3N_4$ sample was 8.91 nm, whereas the average crystallite size for Au particles was found to be 5 nm. The Scherrer equation was found to be accurate when the crystal grain sizes are below 100 nm. In addition, if the synthesis of nanocomposite proceeds under some mechanical forces, then these forces would generate strain in formed crystals resulting in change in the d-spacing which led to change in $\theta$. Under such circumstances, the Williamson-Hall (W-H) equation is recommended to examine the grain size. In order to analyze the crystallite size and strain (leading to broadening of crystallite size), simultaneously, the W-H equation was utilized as shown by Equation (4).

$$D = \frac{K\lambda}{\beta}\cos\theta + \eta\sin\theta \quad (4)$$

Figure 1B:
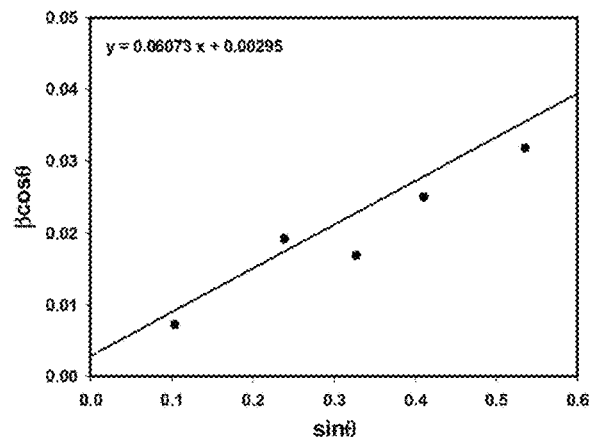
FIG. 1B shows the Williamson-Hall (W-H) plot used to determine the crystallite size of Au@PPy-C/g-C$_3$N$_4$ nanocomposite photocatalyst.

In this equation, Kλ/d corresponds to the Scherer equation while η sin θ signifies the effect of internal strain. Normally, the β-value can be affected by various factors such as the crystallite size, strain, instrumental parameters, and crystal's defects. A typical W-H plot for Au@PPy-C/g-$C_3N_4$ sample showing β cos (θ) versus sin (θ) is shown in FIG. 1B. A linear fit of the plotted data has intercept (Kλ/d) and slope of (η). From the intercept value of the W-H plot, the crystallite size of Au@PPy-C/g-$C_3N_4$ sample was found to be 46.9 nm. It is pertinent to mention here that same XRD peaks of Au@PPy-C/g-$C_3N_4$ sample were utilized in Scherrer equation and W-H plot. A comparison among the results clearly demonstrates that different crystallite sizes have been obtained from Scherer equation and Williamson-Hall plot, confirming the impact of both crystallite size and strain on peak broadening for Au@PPy-C/g-$C_3N_4$ sample.

Figure 2:
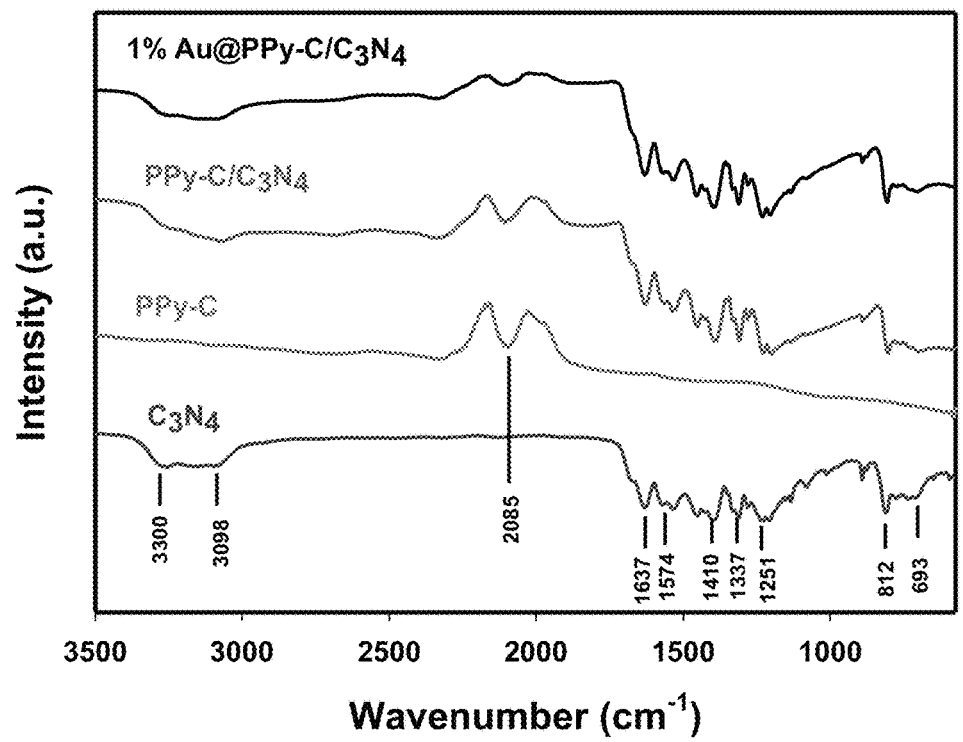
FIG. 2 shows the FTIR analysis of pure g-C$_3$N$_4$, PPy-C, PPy-C/g-C$_3$N$_4$, and Au@PPy-C/g-C$_3$N$_4$ nanocomposite photocatalysts.

The samples were also subjected to FTIR analysis. FIG. 2 shows the FTIR analysis of all newly synthesized samples. Absorption bands appearing at 693 $cm^{-1}$ in all analyzed samples demonstrate typical stretching modes of carbonnitride heterocycles, while the band that appeared at 812 $cm^{-1}$ signifies the characteristic tri-s-triazine ring vibrational mode of g-$C_3N_4$ [Faisal, M., et. al., Ceram. Int., 2020, 46, 22090; and Wang, X., et. al., J. Nanoparticle Res., 2019, 21, 192, each of which is incorporated herein by reference in its entirety]. Series of absorption bands appeared in the range of 1251-1637 $cm^{-1}$ in case of bare g-$C_3N_4$ as well as in fabricated composite nanostructures at 1251, 1337, 1410, 1574 and 1637 $cm^{-1}$, attributed to the stretching vibrational modes of C=N and C—N bonds [Raeisi-Kheirabadi, N., & Nezamzadeh-Ejhieh, A., Int. J. Hydrogen Energy, 2020, 45, 33381, incorporated herein by reference in its entirety]. The band appearing at 2085 $cm^{-1}$ in case of pure PPy-C was also observed in every composite sample indicating the CEN stretching vibrational mode [Zhou, M., et. al., RSC Adv., 2012, 2, 5495, incorporated herein by reference in its entirety]. Furthermore, the band that appeared at 3098 $cm^{-1}$ reflects the N—H stretching vibration while the absorption band at 3335 $cm^{-1}$ is consistent with the C—H stretching mode [Zhou, X., et. al., J. Mater. Chem., 2012, 22, 17900, incorporated herein by reference in its entirety]. It is pertinent to mention here that no distinct band for Au—O vibrational mode was observed (usually occurs at 818 $cm^{-1}$) during the analysis. However, the observed vibrational peak near that region was correlated to the out-of-plane bending vibrational mode of the CN heterocyclic framework [Sun, X., et. al., Angew. Chem. Int. Ed., 2004, 116, 6520, incorporated herein by reference in its entirety].

Figure 3A:
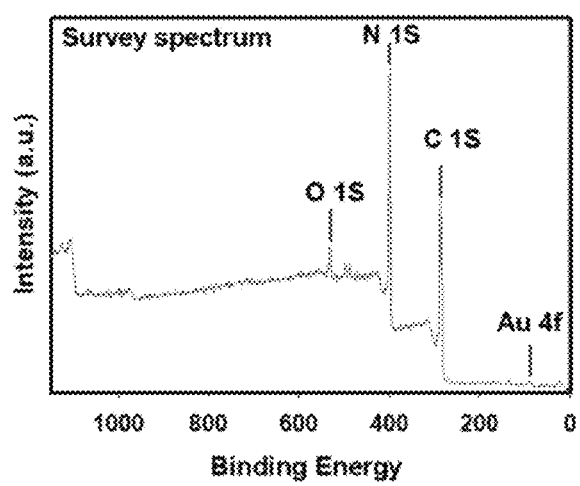
FIGS. 3A-3E are XPS spectra of Au@PPy C/g-C$_3$N$_4$ nanocomposite photocatalyst where
Figure 3B:
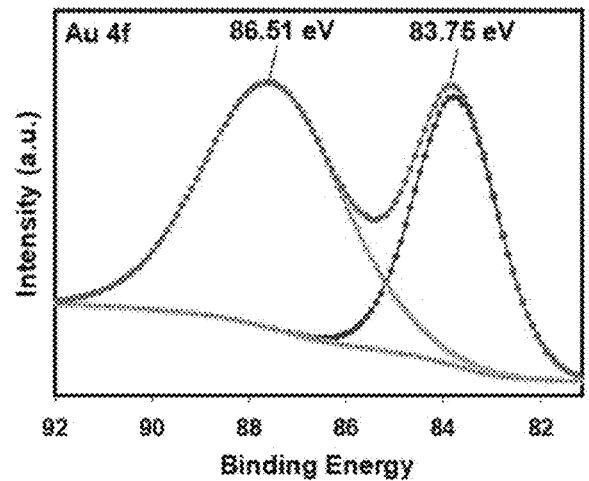
Figure 3C:
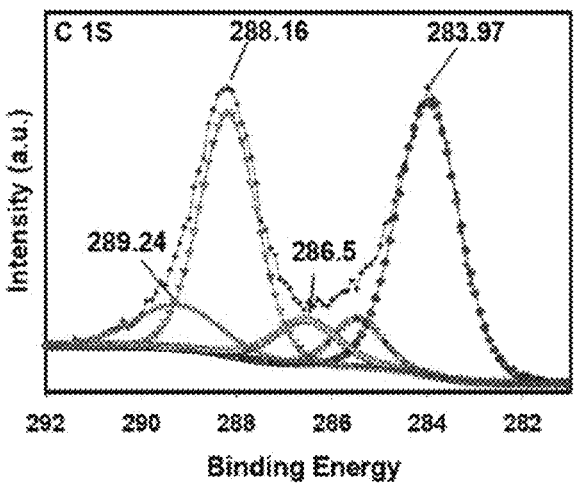
Figure 3D:
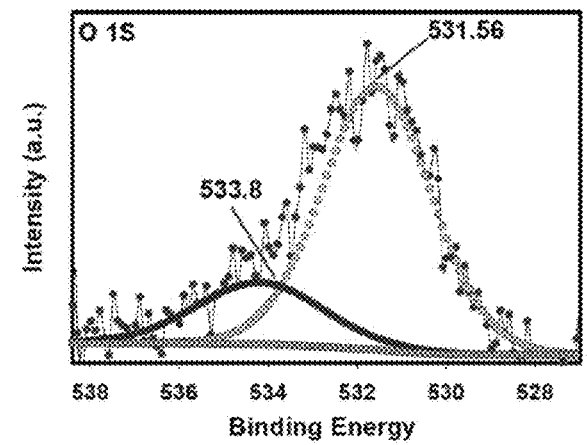
Figure 3E:
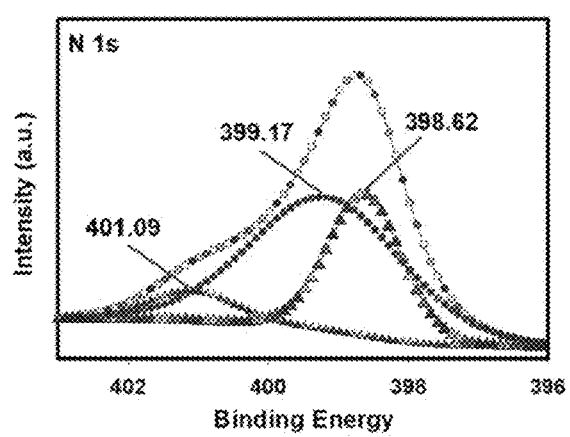

The XPS analysis was conducted on Au@PPy-C/g-$C_3N_4$ photocatalyst to investigate the successful creation of ternary structure and to confirm the presence of each element along with its oxidation state. Wide scan XPS spectrum of Au@PPy-C/g-$C_3N_4$ photocatalyst is shown in FIG. 3A, which elucidates that the fabricated hybrid material comprises impurity-free Au, C, O, and N elements. The appearance of O element might be due to the existence of surface adsorbed —OH. The appearance of two peaks in FIG. 3B at 83.75 and 86.51 eV in the Au-4f spectrum are attributed respectively to the $Au4f_{7/2}$ and $Au4f_{5/2}$ of metallic gold [Zhu, C., et. al., Nanoscale, 2012, 4, 1641; Li, Y., et. al., Energy Environ. Sci., 2013, 6, 2156; and Xu, Z., et. al., Electrochem. Commun., 2011, 13, 1260, each of which is incorporated herein by reference in its entirety]. FIG. 3C shows the XPS spectrum of the C-1s region reflecting two peaks at 283.9 and 288.16 eV confirming the presence of carbon atoms in C—C/C—H and C=O moieties [Sivaranjini, R., et. al., Sci. Rep., 2018, 8, 8891, incorporated herein by reference in its entirety]. The remaining two deconvoluted XPS peaks appearing at binding energy 286.5 and 289.24 eV show the existence of carbon atoms as C—O—C and HO—C=O linkage [Jayaraman, S., et. al., RSC Adv., 2014, 4, 11288; and Maiti, R., et. al., Nanotechnology, 2014, 25, 495704, each of which is incorporated herein by reference in its entirety]. FIG. 3D shows the XPS spectrum of the O-1s region in which the main peak has been deconvoluted into two peaks at 531.56 eV and 533.8 eV. The peak at 531.56 eV is correlated to $O^{2-}$ ion present in oxygen-deficient areas whereas the peak appearing at 533.8 eV is ascribed to the presence of surface adsorbed oxygen species [Lee, C. W., et. al., Int. J. Hydrogen Energy, 2012, 37, 10557; and Wang, P., et. al., Nanoscale Research Letters, 2018, 13, 33, each of which is incorporated herein by reference in its entirety]. FIG. 3E shows the narrow scan spectrum of the N-1s region displaying three separate convoluted peaks at 398.62, 399.17, and 401.09 eV. The peak at 398.62 eV arises from the nitrogen atom bonded with two carbon atoms (C—N—C), and the remaining two peaks at 399.17 and 401.09 eV are the characteristic peaks that appeared due to nitrogen atoms present in three carbon atoms structure, i.e., [N—(C)3] and C=N—H structure, amino groups [Martha, S., et. al., J. Mater. Chem., 2013, 1, 7816; and Dong, F., et. al., J. Mater. Chem., 2011, 21, 15171, each of which is incorporated herein by reference in its entirety].

Figure 4A:
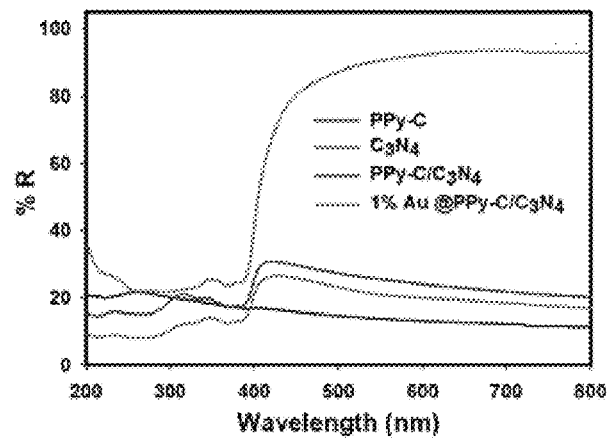
FIG. 4A shows the UV-visible diffuse reflectance spectra of PPy-C, pure g-C$_3$N$_4$, PPy-C/g-C$_3$N$_4$, and Au@PPy-C/g-C$_3$N$_4$ nanocomposite photocatalysts.
Figure 4B:
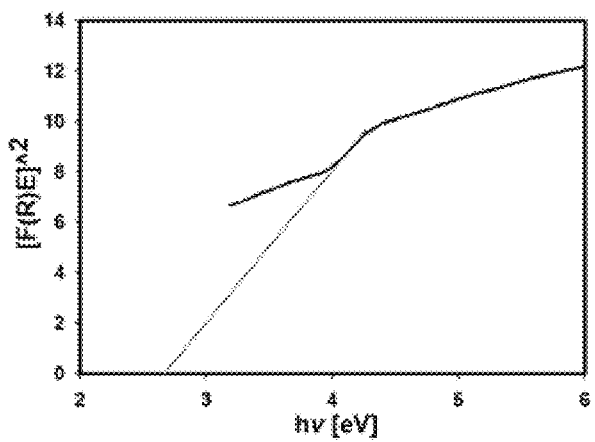
FIG. 4B is a plot of the transferred Kubelka-Munk vs. energy of light absorbed for Au@PPy-C/g-C$_3$N$_4$ photocatalyst.

The UV-visible diffuse reflectance spectroscopy was collected for all prepared samples as the photocatalytic performance of any newly designed structure is highly influenced by its optical properties (FIG. 4A). The data from diffuse reflectance spectra was plotted using the Kubelka-Munk function $[F(R) E]^2$ vs. absorbed light energy E to determine the band-gap energy ($E_g$) applying Equation (1) described above (see FIG. 4B).

For each newly prepared sample, the optical bandgap energy ($E_g$) was determined by plotting the tangent line in Tauc plots of $[F(R) E]2$ vs. hv for the Au@PPy-C/g-$C_3N_4$ sample. The $E_g$ for bare g-$C_3N_4$, PPy-C/g-$C_3N_4$ and Au@PPy-C/g-$C_3N_4$ nanocomposites were found to be 2.74, 2.68, and 2.60 eV, respectively. The obtained value for the pristine sample is in good agreement with the literature [Zhou, X., et. al., J. Mater. Chem., 2012, 22, 17900]. The acquired band gap energy values in the visible region of absorption spectra demonstrate that the photocatalyst is usable under visible light irradiation.

Figure 5A:
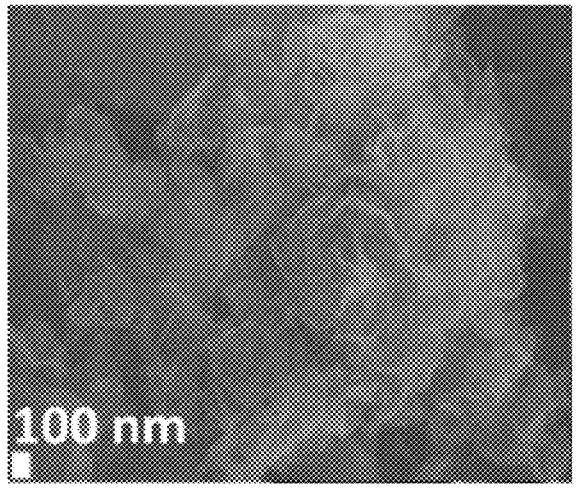
FIGS. 5A-5D are SEM images of pure g-C$_3$N$_4$ (FIG. 5A), PPy-C (FIG. 5B), PPy-C/g-C$_3$N$_4$ (FIG. 5C), and Au@PPy-C/g-C$_3$N$_4$ (FIG. 5D).
Figure 5B:
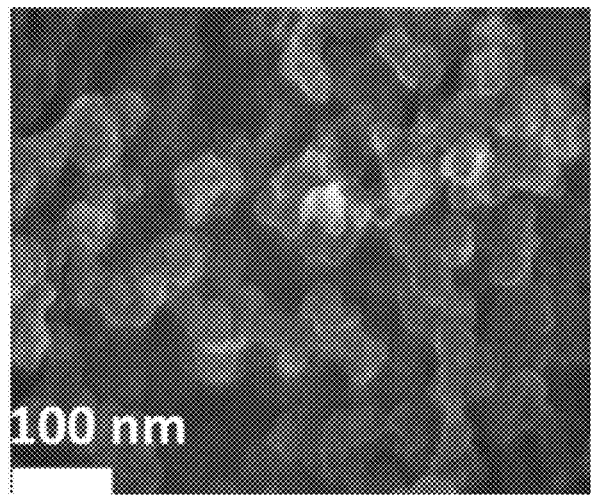
Figure 5C:
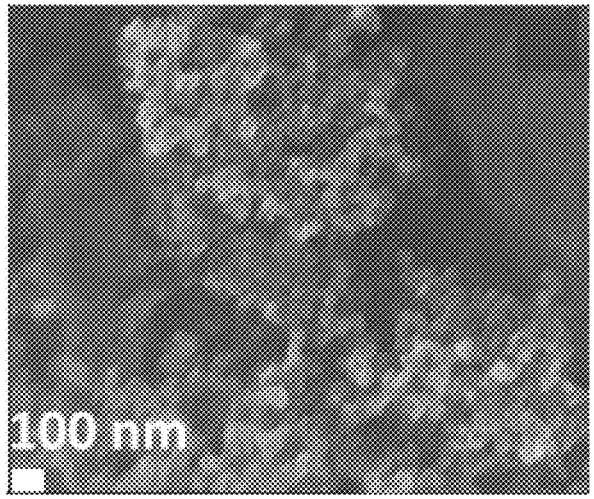
Figure 5D:
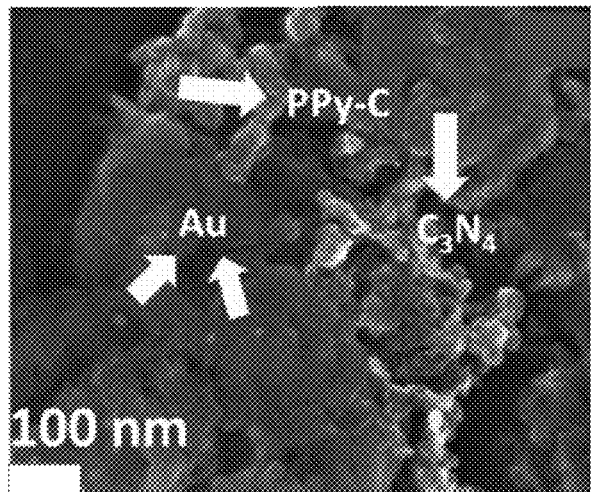
Figure 5E:
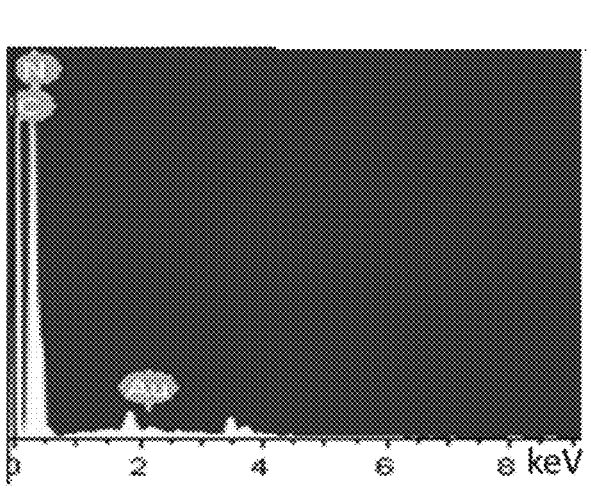
FIG. 5E is a plot of the energy-dispersive X-ray analysis of Au@PPy-C/g-C$_3$N$_4$ nanocomposite photocatalyst.

The FESEM image of pure g-$C_3N_4$ presents a vastly fluffy sheet-like structure systematized in a stacking manner (FIG. 5A) whereas the PPy-C sample exhibits a highly dense spongy dumbbell shape polymeric network (FIG. 5B). In the case of PPy-C/g-$C_3N_4$ nanocomposite, the spongy dumbbell shape polymeric network of PPy-C is intermingled/homogeneously distributed upon the g-$C_3N_4$ sheets as shown in FIG. 5C. Successful creation of ternary nanocomposite has been confirmed by the presence of all three selected moieties i.e Au, PPy-C, and g-$C_3N_4$ in the resultant mixture as shown in FIG. 5D. The FESEM images confirmed the presence of 5-15 nm size Au nanoparticles very well dispersed on PPy-C/g-$C_3N_4$ nanocomposite which signifying the effective creation of ternary framework. To confirm the elemental composition of the designed ternary framework, the EDS analysis was also performed and is shown in FIG. 5E. The EDS investigation confirmed the presence of all elements involved in the nanocomposite formation. The presence of gold, carbon, and nitrogen in the investigated sample confirmed the formation of impurity-free ternary organization among Au, PPy-C, and g-$C_3N_4$.

Figure 6A:
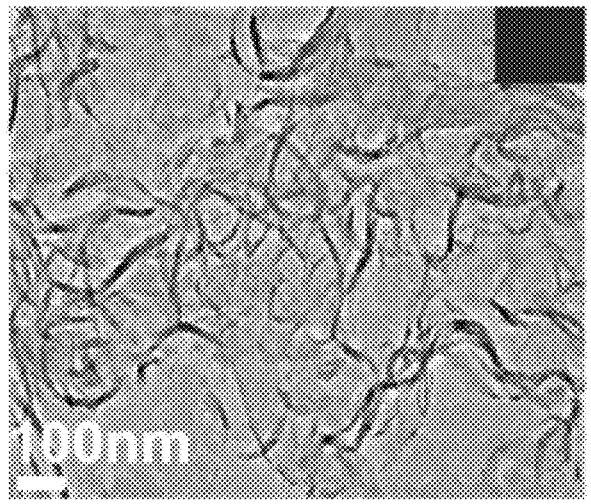
FIGS. 6A-6D are TEM images of g-C$_3$N$_4$ (FIG. 6A), PPy-C (FIG. 6B), PPy-C/g-C$_3$N$_4$ (FIG. 6C), and Au@PPy-C/g-C$_3$N$_4$ (FIG. 6D).
Figure 6B:
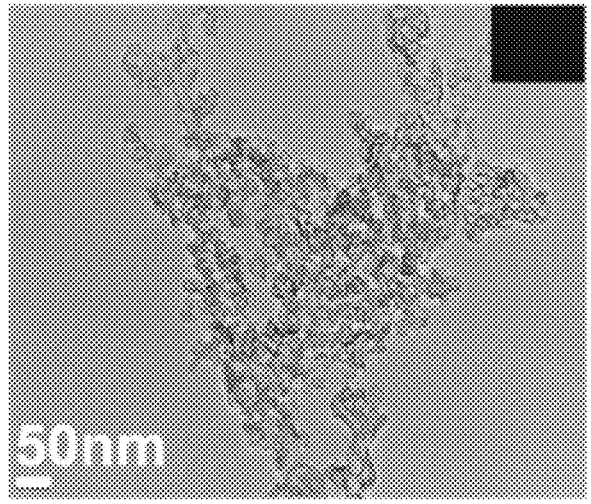
Figure 6C:
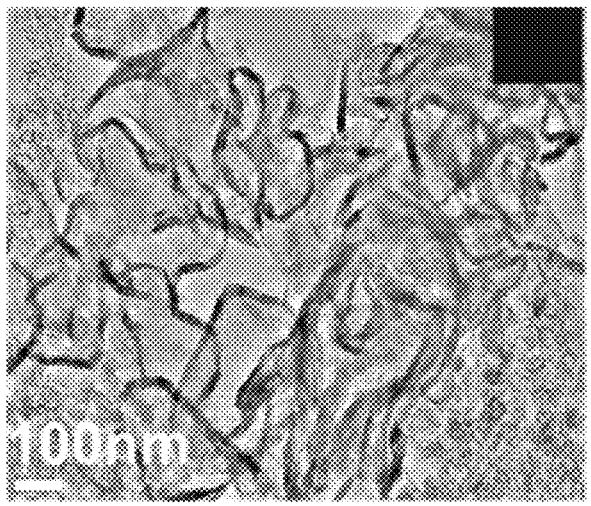
Figure 6D:
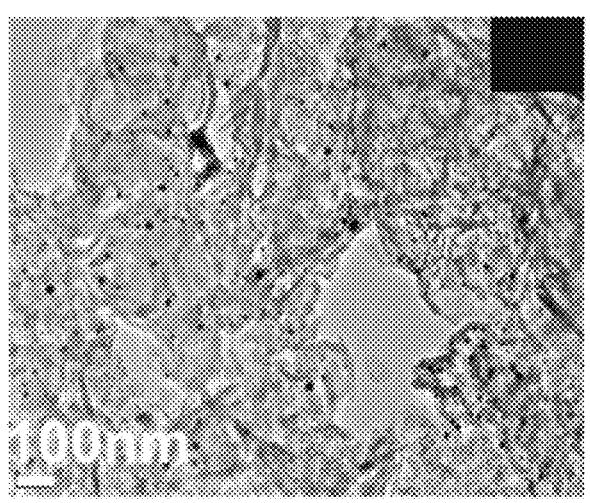
Figure 6E:
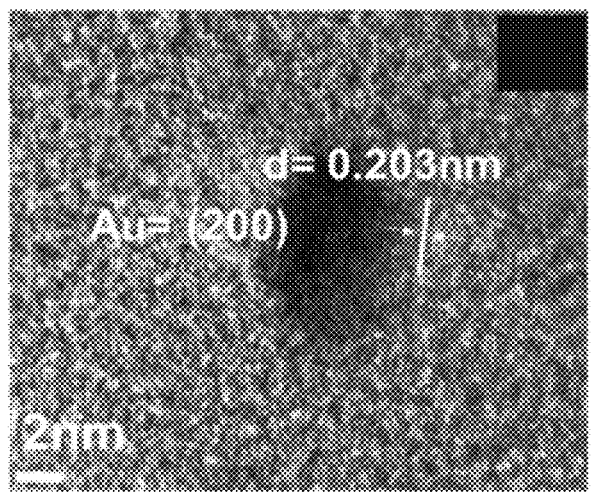
FIG. 6E is a high-resolution TEM (HRTEM) image of a single Au nanoparticle in a sample of Au@PPy-C/g-C$_3$N$_4$.
Figure 6F:
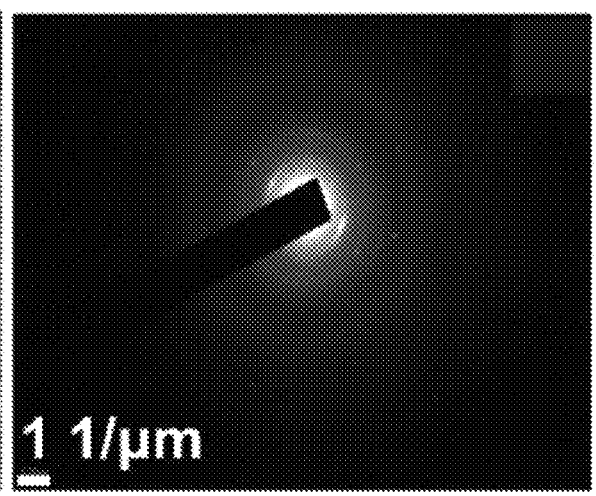
FIG. 6F is a selected area electron diffraction of Au@PPy-C/g-C$_3$N$_4$ nanocomposite photocatalyst.

To further clarify the formation of ternary framework among Au, PPy-C and g-$C_3N_4$, TEM analysis has been performed and displayed in FIGS. 6A-6D. Bare g-$C_3N_4$ possesses interwoven sheet or layered graphitic structure where the size of the sheets ranging from 100 to 300 nm (FIG. 6A). On the other hand, the PPy-C shows spongy nodes like structures interconnected very well with each other's (FIG. 6B). After introducing 10 wt % of PPy-C polymer a well-organized composite structure was successfully formed between the PPy-C and g-$C_3N_4$, where the former showed a sponge-like network intermingled perfectly with g-$C_3N_4$ sheets as shown in FIG. 6C. Lastly, after the photo-deposition of 1 wt % Au, a ternary framework was formed as displayed in FIG. 6D, where Au NPs (5-15 nm) were easily detected in the nanocomposite. The HRTEM analysis of a single Au nanoparticle is shown in FIG. 6E, where 0.203 nm lattice spacing is noticed corresponding to the (200) lattice planes of metallic Au, which further confirms the presence of noble metal Au in the ternary structure [Li, H., et. al., Catalysts, 2020, 10, 701, incorporated herein by reference in its entirety]. Furthermore, the diffraction ring pattern in selected area electron diffraction (SEAD) in FIG. 6F, implies the semi-crystalline nature of synthesized g-$C_3N_4$. Obtained results of the TEM analysis are a perfect match with the XRD results.

Figure 7A:
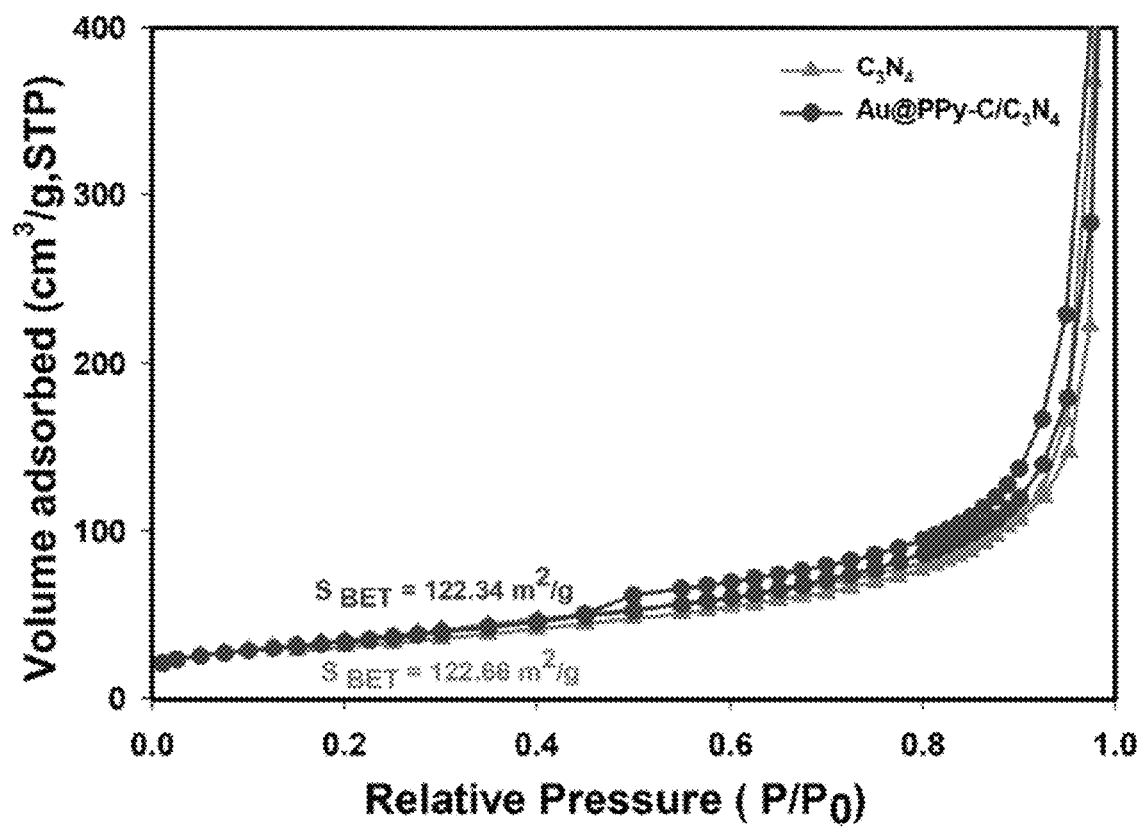
FIG. 7A is a plot of N2 sorption isotherm for pure g-C$_3$N$_4$, and Au@PPy-C/g-C$_3$N$_4$ nanocomposite photocatalyst.
Figure 7B:
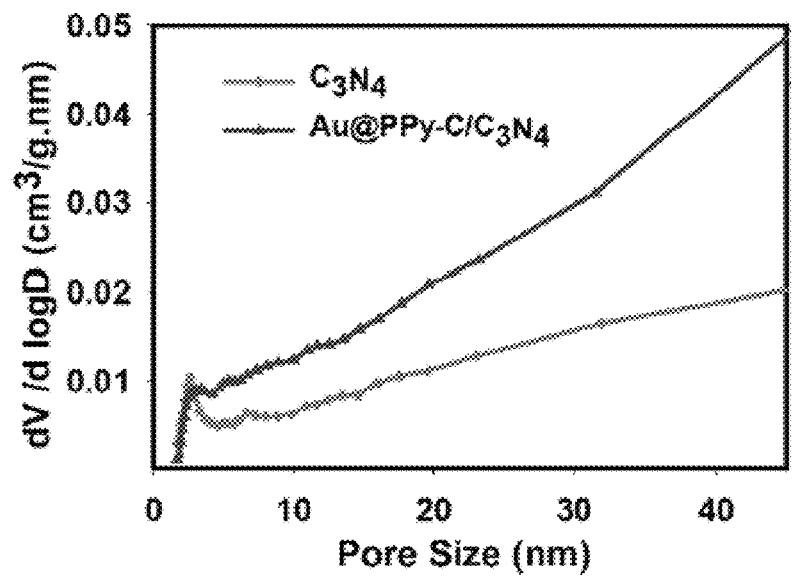
FIG. 7B is a plot of pore size distribution for pure g-C$_3$N$_4$, and Au@PPy-C/g-C$_3$N$_4$ nanocomposite photocatalyst.

The BET surface area and total pore volume have also been evaluated for pure g-$C_3N_4$ and Au@PPy-C/g-$C_3N_4$ nanocomposite as these are crucial factors for a new photocatalyst. Samples were investigated at 77 K through nitrogen adsorption/desorption isotherm technique to determine the textual features as shown in FIG. 7A. Typical adsorption/desorption curves revealed type IV isotherms (identifying mesoporous nature) for both pure g-$C_3N_4$ and newly fabricated Au@PPy-C/g-$C_3N_4$ nanocomposite possessing thin H4 hysteresis loop, confirming the presence of pores in the material under investigation. Pure g-$C_3N_4$ and newly designed Au@PPy-C/g-$C_3N_4$ nanocomposite exhibited a BET surface area of 122.66 $m^2/g$ and 122.34 $m^2/g$, respectively. As far as the surface area is concerned, no significant or noticeable change could be detected after the creation of the trio framework with Au, PPy-C, and g-$C_3N_4$. The average pore size distribution analysis as in FIG. 7B provided an average pore size of Au@PPy-C/g-$C_3N_4$ nanocomposite as 28.3 nm while the value for pure g-$C_3N_4$ was 40.6 nm. The BJH Adsorption cumulative volume of pores for pure g-$C_3N_4$ and the active nanocomposite were 1.2809 and 0.8686 $cm^3/g$, respectively.

Evaluation of Photocatalytic Activity

Efficient generation of highly reactive species like hydroxyl radicals ($\cdot OH$) and superoxide radical anion ($O_2^-\cdot$) during the photocatalytic reaction are responsible for the effective destruction of C—C or C—H organic frameworks of target pollutants. In addition to this, the high surface area of the prepared material and rapid separation of photogenerated electron-hole pairs are the other decisive factors responsible for the extraordinary performance of the newly synthesized photocatalyst.

The photodegradation capability of all synthesized materials, including bare g-$C_3N_4$, PPy-C/g-$C_3N_4$ and Au@PPy-C/g-$C_3N_4$ was examined under visible light using insecticide imidacloprid as a target analyte. Imidacloprid solution was found to be highly stable under catalyst-free visible-light treatment, with no observable decrease or noticeable change in concentration for 25 min visible-light exposure. Conversely, the prepared nanostructures including bare g-$C_3N_4$, PPy-C/g-$C_3N_4$ and Au@PPy-C/g-$C_3N_4$ were found to be photocatalytically active towards the destruction of target insecticide to various levels. Among all tested materials, ternary Au@PPy-C/g-$C_3N_4$ nanocomposite was found to have the best photocatalytic activity, with complete destruction of imidacloprid in just 25 min of irradiation.

Figure 8A:
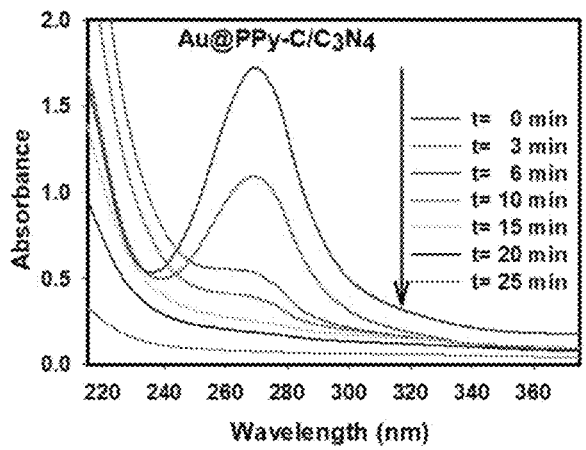
FIG. 8A is a plot of absorbance vs. wavelength as a function of illumination time for photocatalytic degradation of Imidacloprid using Au@PPy-C/g-C$_3$N$_4$ nanocomposite photocatalyst.

FIG. 8A shows the obtained adsorption spectra of the imidacloprid solution in presence of Au@PPy-C/g-$C_3N_4$ at different time intervals under visible light irradiation. The observed trends very clearly demonstrate the rapid and effective photocatalytic activity toward degradation of organic pollutants of the Au@PPy-C/g-$C_3N_4$ nanocomposite framework. The absorbance peak at $\lambda=270$ nm (at $\lambda_{max}$) decreased in intensity very rapidly in presence of Au@PPy-C/g-$C_3N_4$ nanocomposite, becoming undetectable in just 25 min resulting in an entirely flattened absorbance spectral line.

Figure 8B:
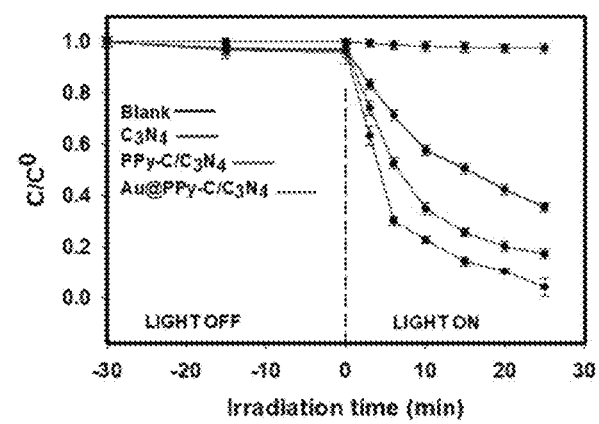
FIG. 8B is a plot of the change in concentration vs. illumination time for photocatalytic degradation of Imidacloprid using Au@PPy-C/g-C$_3$N$_4$ nanocomposite photocatalyst.

The change in imidacloprid concentration in the absence and presence of different photocatalysts under visible light are shown in FIG. 8B. The obtained curve for change in concentration in absence of photocatalyst after 25 min of irradiation showed almost negligible removal of target insecticide, whereas a very fast destruction of imidacloprid was observed in presence of different materials under identical reaction conditions. It is noteworthy that both nanocomposite frameworks i.e. PPy-C/g-$C_3N_4$ and Au@PPy-C/g-$C_3N_4$ were found to be more active in terms of photocatalytic reactivity than the bare g-$C_3N_4$, demonstrating the significance and importance of modification/tailoring during the development and designing of smart photocatalysts. The degradation results showed 64.54% removal of target imidacloprid in presence of bare g-$C_3N_4$, whereas 82.78% insecticide destruction was observed in presence of PPy-C/g-$C_3N_4$ nanocomposite after 25 min of irradiation. The Au@PPy-C/g-$C_3N_4$ ternary nanocomposite, however, was the most reactive, with 96.0% removal of imidacloprid in only 25 min. This high activity is indicative of the successful and effective development of highly efficient ternary photocatalyst by combining Au, PPy-C, and g-$C_3N_4$. The synergistic effect of the constituent moieties is crucial factor in overcoming or suppressing the disadvantageous recombination of photogenerated electron-hole pairs, which results in the exceptional performance of this photocatalyst.

The Langmuir-Hinshelwood (L-H) kinetics model was utilized to model the kinetic parts in the heterogeneous photocatalysis, monolayer adsorption of target pollutant, or the product on the surface of adsorbent. The L-H model is described by the typical Equation (5).

$$r = -dCdt = \frac{k'KC}{1} + KC = k\theta \tag{5}$$

In Equation (5), r denotes the rate of the reaction (mg/L min), k' signifies specific rate constant of the reaction (mg/L min), K is the equilibrium constant of the reaction (L/mg).

At low concentration of the pollutant (C), an apparent first-order reaction occurred. The logarithmic form of the equation is described by equation (b) that has been commonly used by researchers as the simple form of the L-H model. Such equation is true for an apparent first-order reaction, where C0 and C are the initial and final concentrations of the pollutant at time t, and k represents the apparent first-order rate constant [Iazdani, F., & Nezamzadeh-Ejhieh, A., Spectrochim. Acta Mol. Biomol. Spectrosc., 2021, 250, 119348; and Pourshirband, N., et. al., Chem. Phys. Lett., 2020, 761, 138090, each of which is incorporated herein by reference in its entirety].

$$\ln C/C_0 = -kKt = kt \qquad (6)$$

Figure 8C:
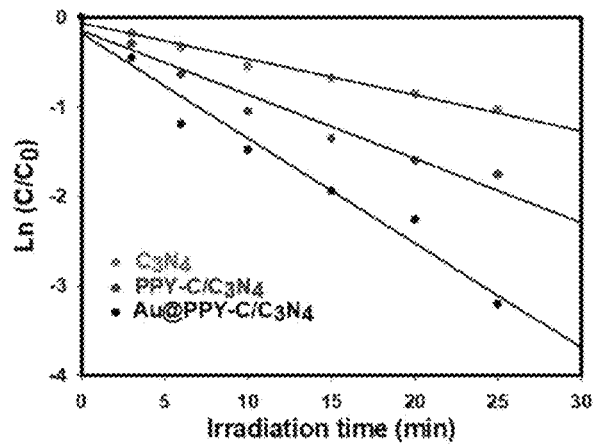
FIGS. 8C-8D show a comparison of rate constant (k) for the decomposition of Imidacloprid using the prepared samples: pure g-C$_3$N$_4$, PPy-C/g-C$_3$N$_4$ and Au@PPy-C/g-C$_3$N$_4$ photocatalysts where

All newly fabricated photocatalysts have been evaluated utilizing equation (6) for the determination of rate constant (k) values as shown in FIG. 8C.

Figure 8D:
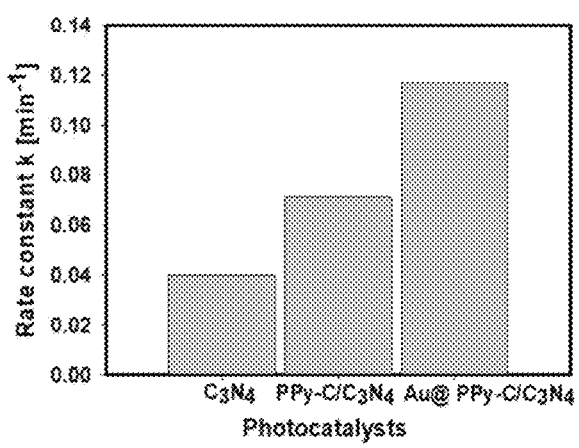

A graph of the rate constant (k) for the various materials is depicted in FIG. 8D. The values of the rate constant (k) again demonstrate the importance of composite structure in photocatalytic activity. The rate constant (k) value increases linearly from 0.0402 $min^{-1}$ to 0.117 $min^{-1}$ as the bare $g-C_3N_4$ was modified to $Au@PPy-C/g-C_3N_4$ ternary nanocomposite. The observed rate constant value of $Au@PPy-C/g-C_3N_4$ ternary photocatalyst was ~2.91 times higher efficiency than bare $g-C_3N_4$, indicating a dramatic increase in photocatalytic activity upon formation of the composite. The $Au@PPy-C/g-C_3N_4$ exhibited the best performance among all designed photocatalysts in degrading imidacloprid. From the above investigations, it is clear that the photocatalytic removal of target analyte imidacloprid increases with modification i.e. altering the bare $g-C_3N_4$ to $PPy-C/g-C_3N_4$ nanocomposite structure. Interestingly, the dispersion of metallic Au NPs onto the $PPy-C/g-C_3N_4$ nanocomposite led to the creation of $Au@PPy-C/g-C_3N_4$ ternary structure, an extremely effective ternary photocatalyst for the degradation of the imidacloprid framework. This ternary moiety has proven to be the most effective composite material, exhibiting the highest degradation percentage of the imidacloprid. The extraordinary performance of $Au@PPy-C/g-C_3N_4$ nanocomposite may be due to; (i) the conducting polymer PPy present in conjugation with carbon (i.e. PPy-C) upon visible-light exposure proficiently supplies electrons to the conduction band of $g-C_3N_4$. These electrons migrate to the exposed surface of $g-C_3N_4$ where they dynamically react with water and oxygen to generate highly active hydroxyl radical ($\cdot$OH) and superoxide radical anion ($O_2^{-}\cdot$) which are the key species in the degradation of target analytes. On the other hand, existing C provides a smooth and swift path for charge carriers to migrate to the surface for efficacious redox reactions. In the case of bare $g-C_3N_4$, nitrogen atoms are linked to the ring structure of heptazine which causes hindrance in flow of charge carriers whereas in the case of composite structure interaction between carbon and $g-C_3N_4$ led to the creation of big pi bonds which can provide a smooth platform for efficient channeling of charge carrier [Liu, G., et. al., Int. J. Hydrogen Energy, 2019, 44, 25671; and Cao, J., et. al., Ceram. Int., 2020, 46, 7888, each of which is incorporated herein in its entirety]. (ii) The deposition of Au NPs also played a crucial role in enhancing the performance of $Au@PPy-C/g-C_3N_4$ by scattering the exposed visible light owing to the effective surface plasmon resonance (SPR) effect which ultimately increases the visible-light absorption skills of newly designed ternary photocatalyst, resulting in an improvement in photocatalytic performance [(Schmucker, A. L., et. al., ACS Nano, 2010, 4, 5453; Skrabalak, S. E., et. al., Acc. Chem. Res., 2008, 41, 1587; Zhao, J., et. al., Acc. Chem. Res., 2008, 41, 1710; and Daniel, M.-C., & Astruc, D., Chem. Rev., 2004, 104, 293, each of which is incorporated herein in its entirety]. Furthermore, the plasmonic effect between Au and $g-C_3N_4$ enhances the effective separation or suppressed the recombination of photogenerated $e^-/h^+$ pairs leading to efficient/abundant production of hydroxyl radical ($\cdot$OH) and superoxide radical anion ($O_2^{-}\cdot$), prime destructive agents for target pollutants. (iii) The introduction of Au and PPy-C in $g-C_3N_4$ to design the ternary photocatalyst led to lowering the band-gap in comparison to the bare $g-C_3N_4$, which increases the visible-light absorption range of $Au@PPy-C/g-C_3N_4$ to create more photogenerated $e^-/h^+$ pairs, which can increase the rate of generation of charge carriers resulting in enhancement of photocatalytic performance.

Figure 9:
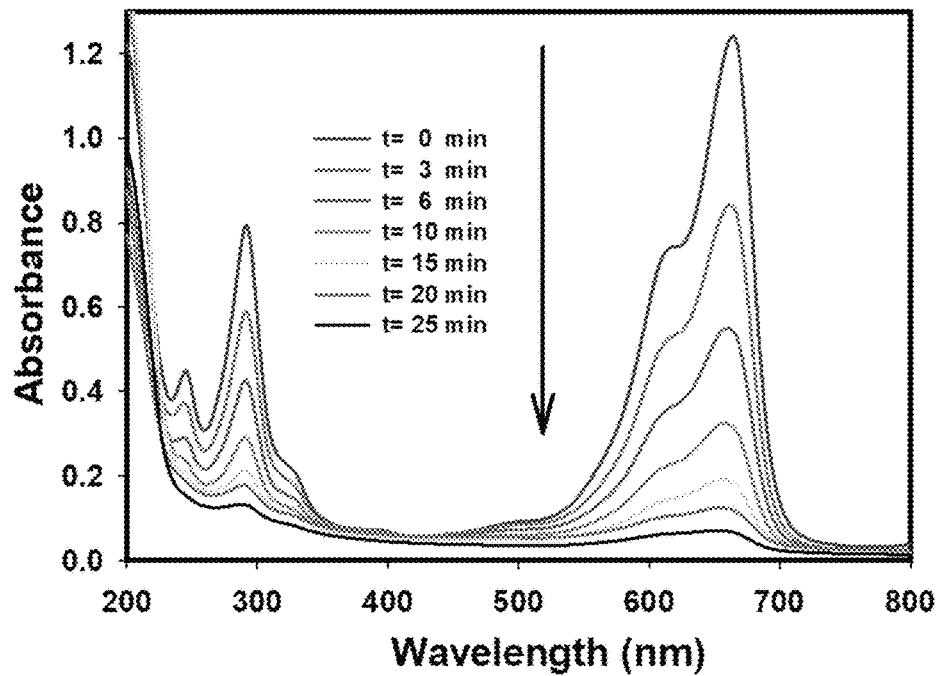
FIG. 9 shows the absorbance vs. wavelength as a function of illumination time for the photocatalytic degradation of MB (0.02 mM solution) with Au@PPy-C/g-C$_3$N$_4$ nanocomposite photocatalyst.

In addition, the highly efficient $Au@PPy-C/g-C_3N_4$ ternary photocatalyst was also used for the destruction of complex dye molecules e.g. methylene blue (MB) dye. Two distinct peaks which can be observed in the adsorption spectrum of MB at 291 and 663 nm are completely vanished after 25 min of visible light treatment, signifying the highly reactive nature of $Au@PPy-C/g-C_3N_4$ ternary photocatalyst (FIG. 9). The elimination of MB framework occurs either by the oxidative mechanism producing totally baseline absorption spectrum in the region of MB or by the decolorization of MB through formation of leuco-MB through a two-electron reduction route [Jalalah, M., et. al., J. Ind. Eng. Chem., 2015, 30, 183, and Park, H. & Choi, W., J. Phys. Chem. B, 2005, 109, 11667, each of which is incorporated herein by reference in its entirety]. During the whole treatment process, no discrete hump or peak of leuco-MB at λ=256 nm was observed, confirming that the removal of target MB dye progressed via an oxidative route.

Figure 10:
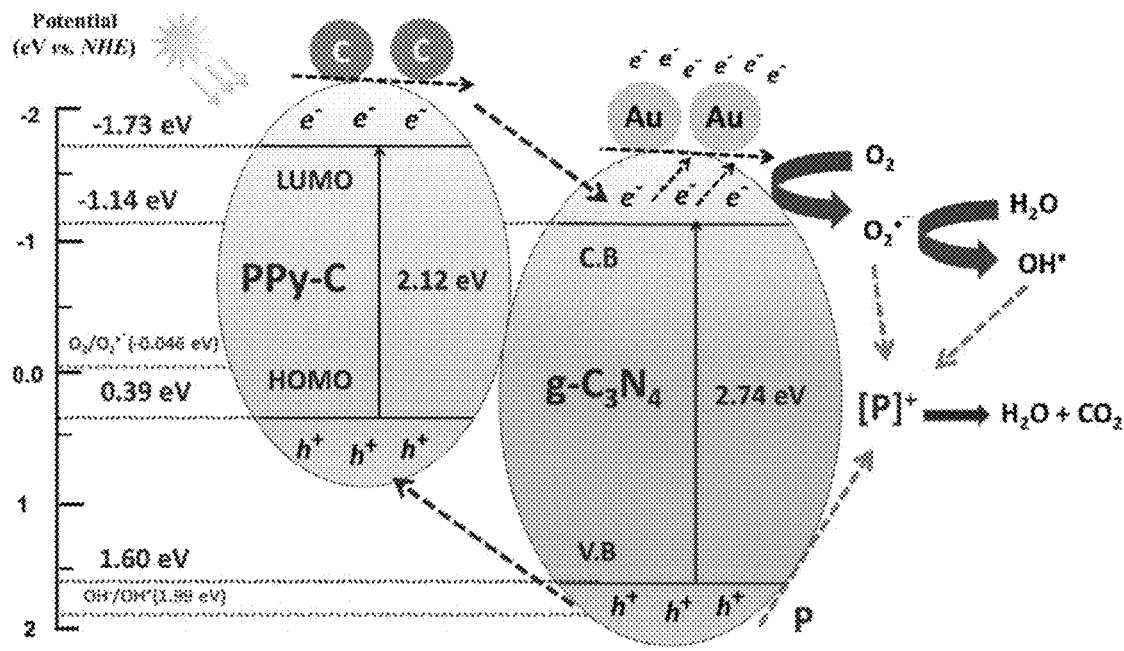
FIG. 10 is a schematic illustration of the proposed photoreaction pathway using the current Au@PPy-C/g-C$_3$N$_4$ photocatalyst.

Taking into consideration all above features of newly designed $Au@PPy-C/g-C_3N_4$ ternary photocatalyst, a possible degradation mechanism of imidacloprid has been proposed and presented in FIG. 10 For a better schematic representation, the positions of conduction and valence bands of $g-C_3N_4$ were estimated by applying the following equations [Helal A., et. al., Appl. Catal. B Environ., 2017, 213, 18, incorporated herein by reference in its entirety]:

$$E_{CB} = X - 0.5E_g + E_0 \qquad (7)$$

$$E_{VB} = E_g + E_{CB} \qquad (8)$$

where $E_{CB}$ and $E_{VB}$ are respectively the potentials of conduction and valence band, $E_g$ represents the band gap energy of $g-C_3N_4$ which is measured here as 2.74 eV, X is the absolute electronegativity of $g-C_3N_4$ which equals to 4.73 eV and $E_0$=−4.5 eV vs. NHE [Liu, Q. Y., et. al., Bull. Mater. Sci., 2017, 40, 1329, incorporated herein by reference in its entirety]. The $E_{CB}$ and $E_{VB}$ positions are accordingly calculated as −1.14 and 1.60 eV, respectively. In addition, the potentials of HOMO and LUMO of PPy are taken as 0.39 eV and −1.73 eV vs. NHE, respectively [Liu, S., et. al., J. Alloys Compd., 2021, 873, 159750, incorporated herein by reference in its entirety].

The exposure of a semiconductor like $g-C_3N_4$ to a visible light will generate electron and hole pairs, where electrons migrate to the conduction band ($E_{CB}$=−1.14 eV) and the holes remain in valence band ($E_{VB}$=1.60 eV). These charged species on acquiring the position at different potentials (electrons: $E_{CB}$=−1.14 eV and holes: 1.60 eV) would move to the surface of $g-C_3N_4$ where they participate in generation of reactive moieties such as superoxide radical anion ($O_2^{-}\cdot$) and hydroxyl radical ($\cdot$OH) by oxidizing water into hydrogen peroxide $H_2O_2$. These reactive species lead to the destruction of target pollutant. It is worth noting that the formation of OH via the reaction of OFF with the VB holes of $g-C_3N_4$ is not possible, since the redox potential ($OH^-$/ $\cdot$OH) is located around +1.99 eV vs. NHE, which is more positive than the VB potential of $g-C_3N_4$ (+1.60 eV vs.

NHE) or the HOMO potential of PPy (+0.39 eV vs. NHE) [Ding, M., et. al., Chin. Chem. Lett., 2020, 31, 1, 71-76, incorporated herein by reference in its entirety]. On the other hand, both the CB potential of g-$C_3N_4$ (−1.14 eV vs. NHE) and the LUMO potential of PPy (−1.73 eV vs. NHE) are more negative than the potential of the redox couple ($O_2$/$O_2^{-}$·−0.046 eV vs. NHE), and hence the $O_2^{-}$· could be produced from dissolved $O_2$. Additionally, the OH radicals can be generated via the reaction of $O_2^{-}$· with $H_2O$ molecules as illustrated in FIG. 10 [Miao, X., et. al., Appl. Catal. B Environ., 2018, 227, 459-469, incorporated herein by reference in its entirety].

Furthermore, the presence of PPy-C in composite framework played a crucial role by supplying more photogenerated electron and hole pairs thereby increasing the transfer rate of electrons during the course of photoreaction. Here, the conductive polymer PPy-C facilitates this charge transfer as a capable electron acceptor leading to suppression of recombination of charge carrier produced by g-$C_3N_4$ [Hayat, A., et. al., Appl. Catal. B Environ., 2019, 213, 18, incorporated herein by reference in its entirety]. Furthermore, the existing C offers a swift path for charge carriers on the composite surface for a redox reaction. In addition to this, the plasmonic effect between Au and g-$C_3N_4$ enhances the effective separation or suppresses the recombination of photogenerated $e^-/h^+$ pairs, leading to efficient production of hydroxyl radical (·OH) and superoxide radical anion ($O_2^{-}$·), which are prime reactive species responsible for the degradation of target pollutants, which ultimately enhanced the photocatalytic performance of Au@PPy-C/g-$C_3N_4$ ternary photocatalyst. The synergistic effect induced by Au, PPy-C and g-$C_3N_4$ can accelerate the formation of highly desirable hydroxyl radical (·OH) and superoxide radical anion ($O_2^{-}$·) and overcome the recombination of charge carriers and hence capable to produce an ultra-fast performance with efficient removal of the target analyte.

Figure 11A:
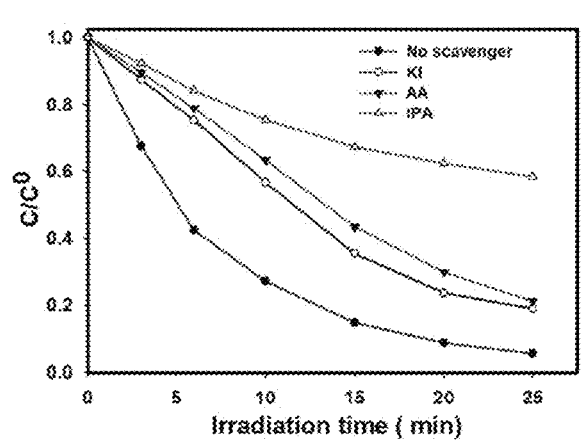
FIG. 11A is a plot of the reactive species trapping experiments of the photodegradation of MB under visible light illumination using Au@PPy-C/g-C$_3$N$_4$ nanocomposite photocatalyst in the presence of different scavengers.

The role of reactive species during the photocatalytic treatment process has been investigated by performing trapping experiments. In typical experiments, 0.01 M concentration of various reactive species scavengers, ascorbic acid (AA) which acts as a superoxide radical anion ($O_2^{-}$·) scavenger, potassium iodide (KI) which acts as ($h^+$) scavenger, and isopropyl alcohol (IPA) which acts as a hydroxyl radicals (·OH) scavenger were added separately to the MB solution [Peng, Y., et. al., Appl. Catal. B Environ., 2017, 203, 946, incorporated herein by reference in its entirety]. As revealed in FIG. 11A, the addition of IPA suppresses the photocatalytic degradation activity to maximum indicating that the produced hydroxyl radicals (·OH) are the predominant reactive species during the photochemical treatment. The addition of KI and AA also showed a slight retarding effect on the degradation of dye molecule, demonstrating that $h^+$ and $O_2^{-}$· species are also involved the photodegradation reaction, but play a minor role compared to the hydroxyl radicals (OH).

Comparison between the activities of the investigated scavenging agents confirmed that the highest decrease in the photocatalytic activity of the proposed ternary photocatalyst was obtained in presence of isopropanol confirming that the photo generated hydroxyl radicals (·OH) are the predominant reactive species responsible for the destruction of dye molecules which were caged by IPA during the photoreaction leading to maximum retardation in degradation rate. Ascorbic acid (AA) was a highly efficient scavenger for trapping superoxide radicals. Its reaction rate constant values are about $8.2 \times 10^8$ $M^{-1}$ $s^{-1}$ with superoxide radicals in acidic conditions that easily generates hydrogen peroxide and ascorbate radical (HA·). The reasonably non-reactive HA· radical disproportionate into dehydroascorbic acid and initial $H_2A$. Another possible reason is the second-order reaction k-value for ascorbic acid with $O_2^{-}$· which is about $2.7 \times 10^6$ $M^{-1}s^{-1}$ [Nandi, A. & Chatterjee, I. B., J. Biosci., 1987, 11, 435, incorporated herein by reference in its entirety]. At physiological pH, ascorbic acid (as the hydrophilic scavenger) exists as its conjugated base ($HA^-$). The presence of this anion ($HA^-$) in scavenging process led to the production of ascorbyl radical (AH) which on deprotonation would change to A anion radical (ascorbyl) which then is stabilized by the electron delocalization process. The $HA^-$/A· redox pair possess a reduction potential of 0.3 V. In general, the chemicals with large number of hydroxyl groups substitution are worthy scavengers of free radicals. AA has four OH groups and hence it has sufficiently high potential to scavenge free radical species, especially superoxide radical anion ($O_2^{-}$·) [Wagner, A. E., et. al., J. Agric. Food Chem, 2008, 56, 11694; Wardman, P., J. Phys. Chem. Ref. Data, 1989, 18, 1637; and Omrani, N. & Nezamzadeh-Ejhieh, A., J. Molecul. Liq, 2020, 315, 113701, each of which is incorporated by reference herein in its entirety]. KI known as hole scavenger is also found to be effective in capturing of photogenerated holes ($h^+$) resulting in considerable retardation in photocatalytic performance of ternary photocatalyst.

Figure 11B:
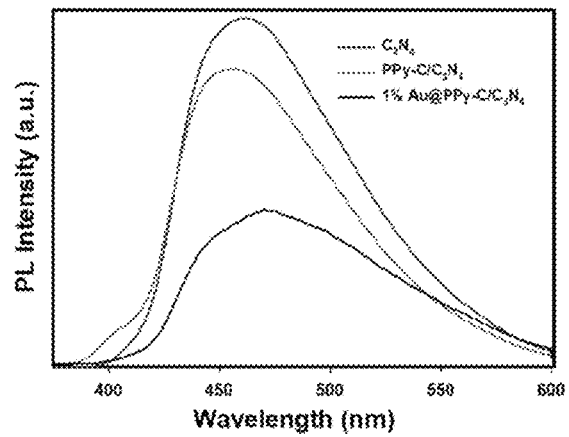
FIG. 11B is a plot of the room-temperature photoluminescence (PL) spectra of the prepared photocatalysts: pure g-C$_3$N$_4$, PPy-C/g-C$_3$N$_4$ and Au@PPy-C/g-C$_3$N$_4$ nanocomposites by dispersing 20 mg in 50 ml water (excited at λ=325 nm).

For a better understanding of the reaction mechanisms in photocatalysis, the photoluminescence (PL) spectral analysis was performed. For all newly prepared photocatalysts, the PL intensity was measured at an excitation wavelength 325 nm, as in FIG. 11B. The obtained PL spectral intensities display the order: bare g-$C_3N_4$>PPy-C/g-$C_3N_4$>Au@PPy-C/g-$C_3N_4$, indicating that the creation of nanocomposites remarkably suppressed the PL intensities in comparison to bare g-$C_3N_4$. The acquired PL spectral pattern order showed that the Au@PPy-C/g-$C_3N_4$ ternary structure presented the lowest intensity among all newly designed samples indicating effective separation of the photo-generated electron-hole pairs among all fabricated samples [Faisal, M., et. al., Separ. Purif. Technol, 2018, 190, 33; and Ismail, A. A., et. al., J. Hazard Mater, 2018, 307, 43, each of which is incorporated herein by reference in its entirety]. This effective retardation in the recombination rate of Au@PPy-C/g-$C_3N_4$ may be a key factor for its extraordinary performance. Herein, the PL examination results perfectly match obtained photocatalytic characteristics.

Figure 12:
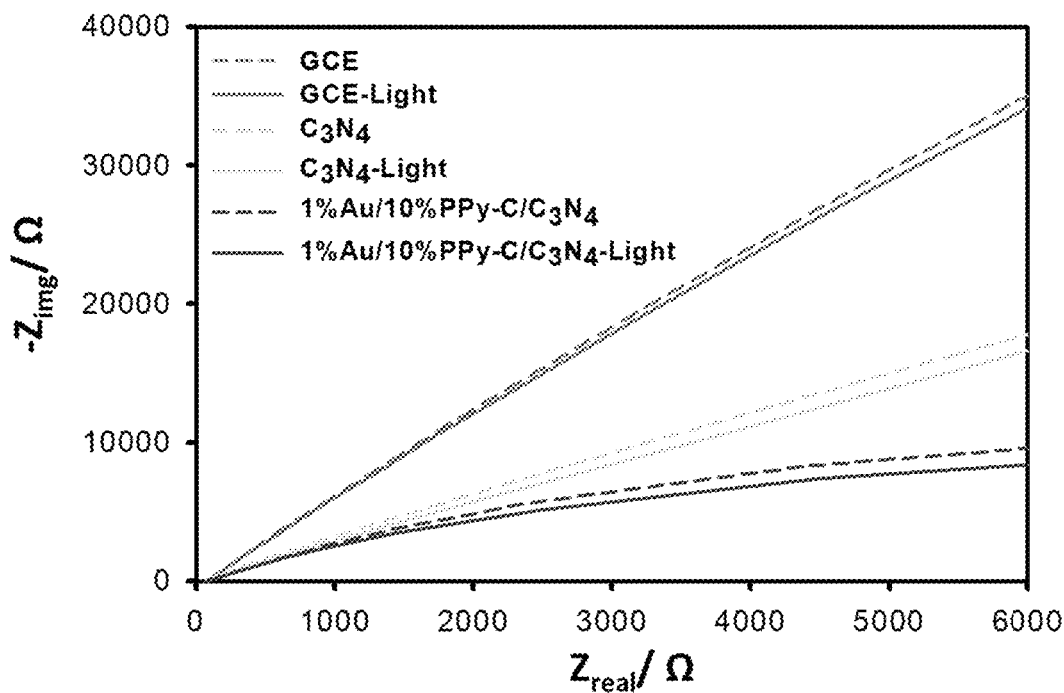
FIG. 12 shows EIS Nyquist plots recorded using C$_3$N$_4$ modified GCE and Au@PPy-C/g-C$_3$N$_4$ modified GC electrode in 0.1 M Na$_2$SO$_4$ aqueous solution at 0.0 V vs. Ag/AgCl (KCl sat.) and 10 mV signal amplitude in the frequency range from 10$^{-2}$ to 10$^5$ Hz.

The electrochemical impedance spectra (EIS) of bare g-$C_3N_4$ and Au@PPy-C/g-$C_3N_4$ nanostructured fabricated electrodes were also studied with and without visible-light source (FIG. 12). The extent or the attained arc size from the Nyquist plot can offer valuable information regarding the effective charge-separation and channeling of electrons at the electrode surface. The arc size follows a similar trend as the photocatalytic activity, i.e. g-$C_3N_4$ (dark)>g-$C_3N_4$ (light)>Au@PPy-C/g-$C_3N_4$ (dark)>Au@PPy-C/g-$C_3N_4$ (light), where the Au@PPy-C/g-$C_3N_4$ under the visible-light exposure has the lowest arc radius in Nyquist plot, signifying the importance of modification or tailoring during the fabrication process leading to a decline in the charge-transfer resistance. For the pure g-$C_3N_4$, it is well known that g-$C_3N_4$ has fast recombination of charge carriers (light-generated electron/hole pairs) owing to the narrow band-gap [Zhu, C., et. al., Nanoscale, 2014, 4, 1641, incorporated herein by reference in its entirety]. In the case of Au@PPy-C/g-$C_3N_4$ composite structure, Au works as a sink for the produced electrons, helps in overcoming the backward reaction of recombination of electron-hole pairs generated during the photo-excitation process, which eventually enhanced the flow of charge. Obtained results from the Nyquist plot clearly demonstrate that on exposure to the visible-light, there was a noticeable resistance reduction in case of Au@PPy-C/g-$C_3N_4$ ternary framework during charge transfer, which means that the tailoring or modification enhances the movement of charge carriers, a characteristic highly desirable in photocatalysts. Therefore, the obtained results clearly confirmed that the semiconductor like g-$C_3N_4$ along with PPy-C and Au NPs upon exposure to visible light have effective SPR phenomenon due to Au NPs, which could effectually advance the charge flow in g-$C_3N_4$ nanostructure leading to amazingly improved photocatalytic activity. Gold nanoparticles have shown such enhancement in titanium dioxide as well [Dozzi, M. V., et. al., Phys. Chem. Chem. Phys., 2009, 11, 7171-7180, incorporated herein by reference in its entirety]. Attained outcomes from the EIS study are perfectly matched to the above PL spectral analysis and photocatalytic results.

Figure 13:
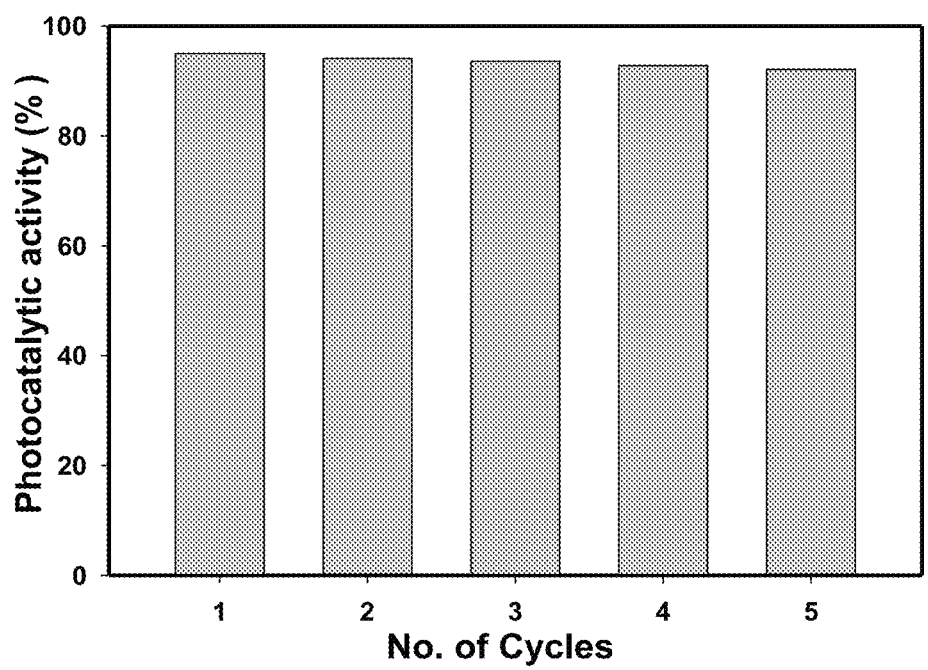
FIG. 13 is a plot depicting repeated cycles up to 5 times of the photocatalytic degradation of MB with Au@PPy-C/g-C$_3$N$_4$ nanocomposite photocatalyst.

As far as the practical implementation of any newly created photocatalytic structure is concerned, operational stability or reusability is a highly crucial parameter. Therefore, the newly created Au@PPy-C/g-$C_3N_4$ ternary photocatalyst has been used (five continuous runs) in the destruction of MB (FIG. 13). Studied Au@PPy-C/g-$C_3N_4$ nanostructures were found to be sufficiently stable but showed a little lower photocatalytic efficiency. This steady and stable performance of Au@PPy-C/g-$C_3N_4$ ternary photocatalyst is advantageous for use as a photocatalyst. The slight reduction in photocatalytic activity of Au@PPy-C/g-$C_3N_4$ can be attributed to the loss of ternary photocatalytic material during separation/washing for its reuse in the next consecutive run.

The invention claimed is:
1. A nanocomposite photocatalyst, comprising:
carbon nitride particles;
a polymer composite comprising a conducting polymer and a carbon nanomaterial, the polymer composite being disposed on the carbon nitride particles; and
noble metal nanoparticles disposed on both the polymer composite and the carbon nitride particles;
wherein the carbon nitride particles are present in an amount of 80 to 94.9 wt %, based on a total weight of nanocomposite photocatalyst.
2. The nanocomposite photocatalyst of claim 1, wherein the carbon nitride particles are graphitic carbon nitride (g-$C_3N_4$).
3. The nanocomposite photocatalyst of claim 1, wherein the carbon nitride particles have a mean particle size of 100 to 300 nm, are crystalline by PXRD, and have a mean crystallite size of 5 to 15 nm.
4. The nanocomposite photocatalyst of claim 1, wherein the polymer composite is present in an amount of 5 to 15 wt %, based on a total weight of nanocomposite photocatalyst.
5. The nanocomposite photocatalyst of claim 1, wherein the conducting polymer is polypyrrole.
6. A nanocomposite photocatalyst, comprising:
carbon nitride particles;
a polymer composite comprising a conducting polymer and a carbon nanomaterial the polymer composite being disposed on the carbon nitride particles; and
noble metal nanoparticles disposed on both the polymer composite and the carbon nitride particles;
wherein the carbon nanomaterial is carbon black.
7. The nanocomposite photocatalyst of claim 1, wherein the polymer composite comprises 10 to 30 wt % carbon nanomaterial, with the balance being the conducting polymer, based on a total weight of polymer composite.
8. A nanocomposite photocatalyst, comprising:
carbon nitride particles;
a polymer composite comprising a conducting polymer and a carbon nanomaterial, the polymer composite being disposed on the carbon nitride particles; and
noble metal nanoparticles disposed on both the polymer composite and the carbon nitride particles;
wherein the noble metal nanoparticles are gold nanoparticles having a mean particle size of 2 to 20 nm, are crystalline by PXRD, and have a mean crystallite size of 1 to 10 nm.
9. The nanocomposite photocatalyst of claim 1, having a mean surface area of 105 to 140 $m^2/g$, a mean pore size of 20 to 37.5 nm, and a mean pore volume of 0.6 to 1.1 $cm^3/g$.

* * * * *